(12) United States Patent
Takahashi

(10) Patent No.: US 6,832,221 B2
(45) Date of Patent: Dec. 14, 2004

(54) FILING SYSTEM AND METHOD FOR AVOIDING FILING OF IDENTICAL DOCUMENT DATA

(75) Inventor: Hiroshi Takahashi, Kawasaki (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 10/270,349

(22) Filed: Oct. 15, 2002

(65) Prior Publication Data

US 2003/0041306 A1 Feb. 27, 2003

Related U.S. Application Data

(63) Continuation of application No. 09/371,026, filed on Aug. 10, 1999, now abandoned.

(30) Foreign Application Priority Data

Aug. 10, 1998 (JP) .......................................... 10-226064

(51) Int. Cl.[7] .............................. G06F 17/30; G06F 7/00
(52) U.S. Cl. ............................. 707/6; 707/3; 707/104.1; 382/305
(58) Field of Search ...................... 707/1–5, 6; 382/305

(56) References Cited

U.S. PATENT DOCUMENTS

| 4,437,127 A | | 3/1984 | Hirose ........................ 358/296 |
| 4,633,506 A | | 12/1986 | Kato .......................... 382/236 |
| 4,768,099 A | | 8/1988 | Mukai ........................ 358/403 |
| 4,827,330 A | * | 5/1989 | Walsh et al. ................ 358/452 |
| 5,465,353 A | * | 11/1995 | Hull et al. .................... 707/5 |
| 5,668,897 A | * | 9/1997 | Stolfo ........................ 382/283 |

(List continued on next page.)

FOREIGN PATENT DOCUMENTS

| DE | 19534255 | 3/1997 | |
| JP | 5-35737 | 2/1993 | ........... G06F/15/20 |
| JP | 6-119393 | 4/1994 | ........... G06F/15/40 |
| JP | 8-255220 | 10/1996 | ............ G06K/9/20 |
| JP | 9-128402 | 5/1997 | ........... G06F/17/30 |
| JP | 10-154228 | 6/1998 | ............. G06T/1/00 |
| JP | 10-154229 | 6/1998 | ............. G06T/1/00 |
| WO | WO 97/07468 | 2/1997 | ........... G06F/17/30 |

OTHER PUBLICATIONS

Brin, S., J. Davis and H. Garcia–Molina "Copy Detection Mechanisms for Digital Documents", Proceedings of the ACM SIGMOD Conference, Oct. 31, 1994.*

(List continued on next page.)

Primary Examiner—Luke S Wassum
(74) Attorney, Agent, or Firm—Oblon, Spivak, McClelland, Maier & Neustadt, P.C.

(57) ABSTRACT

A file system includes a processing device that processes first data with at least one of a copying function to read image data of an original document and record the read image data on a sheet, a transmitting function to send and receive image data and/or character data via a communication line, and a recording function to record received image data and/or character data on a sheet. The file system also includes a memory device to store the first data processed by the processing device, an identity determination device to determine an identity (i.e., similarity or relation) between the processing data and second data stored in the memory device, and a storage management device stores the first data into the memory device on the basis of a result of a determination made by the identity determination device. The storage management device cancels the storage of the first data into the memory device when the identity determination device determines that the first data is identical to second data stored in the memory device. The identity determination device determines the identity between the first data and the second data stored in the memory device based upon information of processes with which the first data has been processed with the processing device. The information of processes includes information of an original document associated with the first data.

5 Claims, 19 Drawing Sheets

U.S. PATENT DOCUMENTS

| | | | | |
|---|---|---|---|---|
| 5,717,940 A | * | 2/1998 | Peairs | 715/515 |
| 5,857,203 A | * | 1/1999 | Kauffman et al. | 707/200 |
| 5,867,597 A | * | 2/1999 | Peairs et al. | 382/209 |
| 5,893,908 A | * | 4/1999 | Cullen et al. | 707/5 |
| 5,978,477 A | * | 11/1999 | Hull et al. | 380/9 |
| 6,003,030 A | * | 12/1999 | Kenner et al. | 707/10 |
| 6,073,129 A | * | 6/2000 | Levine et al. | 707/4 |
| 6,237,011 B1 | * | 5/2001 | Ferguson et al. | 715/515 |
| 6,243,501 B1 | * | 6/2001 | Jamali | 382/305 |
| 6,397,213 B1 | * | 5/2002 | Cullen et al. | 707/5 |
| 6,424,429 B1 | | 7/2002 | Takahashi et al. | 358/1.16 |
| 6,529,918 B2 | * | 3/2003 | Takahashi | 707/205 |

OTHER PUBLICATIONS

Shivakumar, N. and H. Garcia–Molina "SCAM: A Copy Detection Mechanism for Digital Documents", Proceedings of the $2^{nd}$ International Conference on Theory and Practice of Digital Libraries (DL'95), Jun. 1995.*

Hull, J.J. and J.F. Cullen "Document Image Similarity and Equivalence Detection", Proceedings of the $4^{th}$ International Conference on Document Analysis and Recognition, pp. 308–312, V. 1, Aug. 18–20, 1997.*

Doermann, D., H. Li and O. Kia "The Detection of Duplicates in Document Image Databases", Proceedings of the 4th International Conference on Document Analysis and Recognition, pp. 314–318, V. 1, Aug. 18–20, 1997.*

Shneiderman, B. "Designing the User Interface", Reading:Addison Wesley Longman, pp. 81–82, Mar. 1998. ISBN 0–201–69497–2.*

U.S. patent application Ser. No. 09/177,378, filed Oct. 23, 1998, allowed; not published as of Nov. 17, 2003.

U.S. patent application Ser. No. 09/316,363, filed May 21, 1999, allowed.

European Patent Office, Search Report, Oct. 12, 2001.

* cited by examiner

| | |
|---|---|
| 2 6 H | REGISTERED DATA |
| 2 7 H | BOTH-SIDE COPYING MODE DATA |
| 2 8 H | DIVIDE COPYING MODE DATA |
| 2 9 H | COLLCET COPYING MODE DATA |
| 2 A H | PRINT COPYING MODE DATA |

| | |
|---|---|
| 3 1 H | SHEET FEED POSITION DATA |
| 3 2 H | AUTO SHEET SELECT MODE DATA |
| 3 3 H | DESITY SET DATA |
| 3 4 H | EDIT COPYING MODE DATA |
| 3 5 H | MAGNIFICATION MODE DATA |
| 3 6 H | DOCUMENT TYPE DATA |

| $d_1 d_2$ | DATA CONTENT |
|---|---|
| 0 0 0 0 | INPUT MODE RESET REQUEST |
| 0 0 0 1 ~ F F F F | REGISTERED DATA (1 - 655535) |

FIG. 15

| ○○○○年 Calendar | 27 | 28 | 29 | 30 | 31 | | 59 |
|---|---|---|---|---|---|---|---|
| | | | RETRIEVE | NARROW-DOWN | CALL | | |
| | | 61 | 64 | 63 | 62 | | |

| 日(Sun) | 月(Mon) | 火(Tue) | 水(Wed) | 木(Thu) | 金(Fri) | 土(Sat) |
|---|---|---|---|---|---|---|
| | | | | | | 1 |
| 2 | 3 ▦▦ | 4 | 5 □ | 6 | 7 □□□□ | 8 |
| 9 | 10 □□□ | 11 | 12 | 13 | 14 □□□□ | 15 |
| 16 | 17 □□□□ | 18 □□□□ □□ | 19 | 20 | 21 | 22 |
| 23 | 24 | 25 | 26 □□□ | 27 □□□□ | 28 □ | 29 |
| 30 | | | | | | |

| 日(Sun) | 月(Mon) | 火(Tue) | 水(Wed) | 木(Thu) | 金(Fri) | 土(Sat) |
|---|---|---|---|---|---|---|
| | 1 | 2 | 3 | 4 | 5 | 6 |
| 7 | 8 | 9 | 10 | 11 | 12 | 13 |

FIG. 21(a)

DOCUMENT IMAGE EALUATION

| ASPECTS | EVALUATION WEIGHT |
|---|---|
| ARRANGEMENT | 0 - 10 |
| IMAGE/CHARACTER RATIO | 0 - 10 |
| CONTENTS OF IMAGE AND CHARACTER | 0 - 80 |

| IMAGE ASPECTS | EVALUATION WEIGHT |
|---|---|
| ARRANGEMENT | 0 - 50 |
| COLOR | 0 - 30 |

| CHARACTER ASPECTS | EVALUATION WEIGHT |
|---|---|
| ARRANGEMENT | 0 - 30 |
| COLOR | 0 - 20 |
| NUMBERR OF CHARACTERS | 0 - 20 |
| NUMBER OF PUNCTUATIONS | 0 - 5 |
| KIND OF FONTS | 0 - 5 |

FIG. 21(b)

DOCUMENT EVALUATION

| ASPECT | EVALUATION WEIGHT |
|---|---|
| SIZE | 0 - 50 |
| DIRECTION | 0 - 10 |
| ONE-SIDED OR BOTH-SIDED | 0 - 20 |
| SHEET OR BOOK | 0 - 20 |

# FILING SYSTEM AND METHOD FOR AVOIDING FILING OF IDENTICAL DOCUMENT DATA

BACKGROUND OF THE INVENTION

1. Field of the Invention

The present invention relates to a file system, and more particularly to a file system applied to a data processing system for copying, facsimile network communication, printing or other data processing, that is capable of avoiding filing of identical document data so as to make good use of the storage capacity of a memory device of the filing system.

2. Discussion of the Background

Conventionally, printed documents which are important or documents which may be used in future are filed and placed in order on a shelf or the like. In an office having an enormous amount of documents, however, a large space is required for keeping the documents. Additionally, it takes much time to find a required document.

Accordingly, in recent years, with the advancement of high-speed data processing technologies and with the lowering of storage device prices, there has been proposed a file system for reading documents with a scanner and storing the documents in a mass storage device. These file systems are introduced into not only offices having an enormous amount of documents but also into other places.

With these types of file systems, there have been proposed file systems incorporating features designed to provide easy retrievals of related documents by sorting documents systematically by types in a database and more recently various file systems in which availability has been improved. For example, in Japanese Laid-open Patent Publication No. 5-35737 there is described a file system in which reduced images of stored document data are created and displayed in a calendar view format, and in Japanese Laid-open Patent Publication No. 6-119393 there is described a file system in which data is sorted, registered (stored), and retrieved in a box, calendar, or card format. Furthermore, in Japanese Laid-open Patent Publications No. 8-255220 and No. 9-128402 there are described file systems in which the continuity or similarity of document data is analyzed.

These conventional file systems, however, require reading documents with a scanner and inputting information for retrieval, which is time-consuming. Therefore, documents left for processing tend to pile up. To store these documents in order in the file system, it must be first determined whether or not the documents need to be stored, and then required documents must be read with the scanner individually and an input work is necessary for sorting. Because of this complicated work for filing, users tend to reduce the amount of documents for filing by discarding documents which are not important.

This may cause a problem that some of the discarded documents are not available when they are needed afterward.

Accordingly, when checking whether not each document should be stored, the determination is not always easy, and the determination work takes a long time. Furthermore, documents not required at that time may be needed later.

Generally, documents stored in a file system are those copied for a use in a conference, those sent or received to or from a customer via a facsimile device, or those created by a workstation (WS) or a personal computer (PC) and printed out. In other words, documents to be stored in the file system have been converted to electrical signals and recorded on a recording sheet one or more times. Additionally, documents used for a conference or those to be circulated may be copied repeatedly at different times and places.

SUMMARY OF THE INVENTION

The present invention has been made in view of the above-discussed and other problems, and preferred embodiments of the present invention provide a file system, in which wasteful usage of storage capacity of a memory device is avoided by preventing storing of identical data in the memory device and in which processed data stored in the memory device can be readily reused when required.

According to a preferred embodiment of the present invention, a file system includes a processing device that processes first data (i.e., processing data) with at least one of a copying function to read image data of an original document and record the read image data on a sheet, a transmitting function to send and receive image data and/or character data via a communication line, and a recording function to record received image data and/or character data on a sheet. The file system also includes a memory device to store the processing data processed by the processing device. The file system further includes an identity determination device to determine an identity (i.e., the similarity) between the processing data and second data stored in the memory device, and a storage management device that stores the processing data into the memory device on the basis of a result of a determination made by the identity determination device. The storage management device cancels storing the processing data into the memory device when the identity determination device determines that the processing data is identical to data stored in the memory device. The storage management device adds link information for relating the processing data, determined to be identical to data in the memory device by the identity determination device, with the data in the memory device.

According to the invention, the identity determination device may determine the identity between the processing data and the data stored in the memory device based upon information of processes with which the processing data has been processed with the processing device.

The information of processes may include information of an original document associated with the processing data.

The information of an original document may include information of a size and a direction of the original document, information as to whether the original document has an image on one side or both sides of the original document, or information as to whether the original document is a sheet or book.

The identity determination device may determine a degree of the identity (i.e., the degree of similarity) between the processing data and the data stored in the memory device.

The identity determination device may determine the degree of the identity between the processing data and the data stored in the memory device based upon a degree of an identity of an image of an original document associated with the processing data and/or a degree of an identity of the original document.

The storage management device adds link information for relating the processing data with the data stored in the memory device based upon the degree of the identity determined by the identity determination device.

The file system may further include a display device to display information, an operation device to input instructions, and an output management device to create specific information for specifying data in the memory device to display the specific information on the display device so as to be selected by the operation device and to read out data which has been specified via the selection of the specific information specifying the data from the memory device to output the specified data to the processing device. The output management device displays the specific information of the processing data to which the link information is added on the display device with the degree of the identity being highlighted.

The storage management device may display in the operation device a message for asking a person who processes the processing data about storing of the processing data to the memory device.

The storage management may further include an ID obtaining device to obtain a user ID of a user who processes the processing data with the processing device and add the user ID obtained by the ID obtaining device to the processing data to be stored in the memory device. The identity is determined by the identity determination device between the processing data and the data stored in the memory device having the same user ID.

In the file system, the processing device and the memory device may be networked via an intranet, for example.

According to another embodiment of the present invention, the file system may include a first memory device and a second memory device to store the processing data processed by the processing device. The storage management device may read out a given amount of document data from the first memory device and transfer the given amount of document data to the second memory device when a preset capacity of the first memory device is exceeded.

According to the present invention, data processed by the processing device is stored in the memory device on the basis of a determination result as to whether or not the data processed by the processing device has an identity with data which has already been stored in the memory device. If the processing data is determined to be identical to data in the memory device, storing of the processing data to the memory device is canceled or aborted. Otherwise, the processing data is stored in the memory device. Therefore, the processing data is not only processed by the processing device but also stored in the memory device if the data is not identical to the stored data, without any works for storing the data in the memory device, and further, the storage capacity of the memory device is saved by avoiding storage of the processing data in the memory device when the identical data exists in the memory device.

Further, if the processing data has some identity with data in the memory device, the processing data processed by the processing device is stored in the memory device with link information for relating the processing data with the already stored data associated with the processing data. Specific information of the data in the memory device, for example, a thumbnail image of the data, is displayed in a calendar display format with a degree of the identity highlighted. Therefore, processing data having a higher degree of the identity can be easily discriminated from other data so as to be selected and is output to a connected processing device for processing the data there.

Furthermore, the storage management device asks a person who processes the processing data with a processing device about storing of the processing data into the memory device. Storing of the processing data having an identity with the already stored data is canceled only according to an instruction of the person who processes the processing data, i.e., only when the person processing the data with the processing device specifies that the storage to the memory means is unnecessary. Therefore, an automatic storage of the processing data is never canceled, nor is the processing data associated with another data against an operator's will.

BRIEF DESCRIPTION OF THE DRAWINGS

A more complete appreciation of the present invention and many of the attendant advantages of thereof will be readily obtained as the same becomes better understood by reference to the following detailed description when considered in conjunction with the accompany drawings wherein:

FIG. 15 is a display screen for referencing the filed processing data in the file system;

FIGS. 21(*a*) and 21(*b*) are diagrams for explaining the aspects of an image of a document and the document for determining a degree of an identity of document data.

DETAILED DESCRIPTION OF THE PREFERRED EMBODIMENTS

Figure 1:
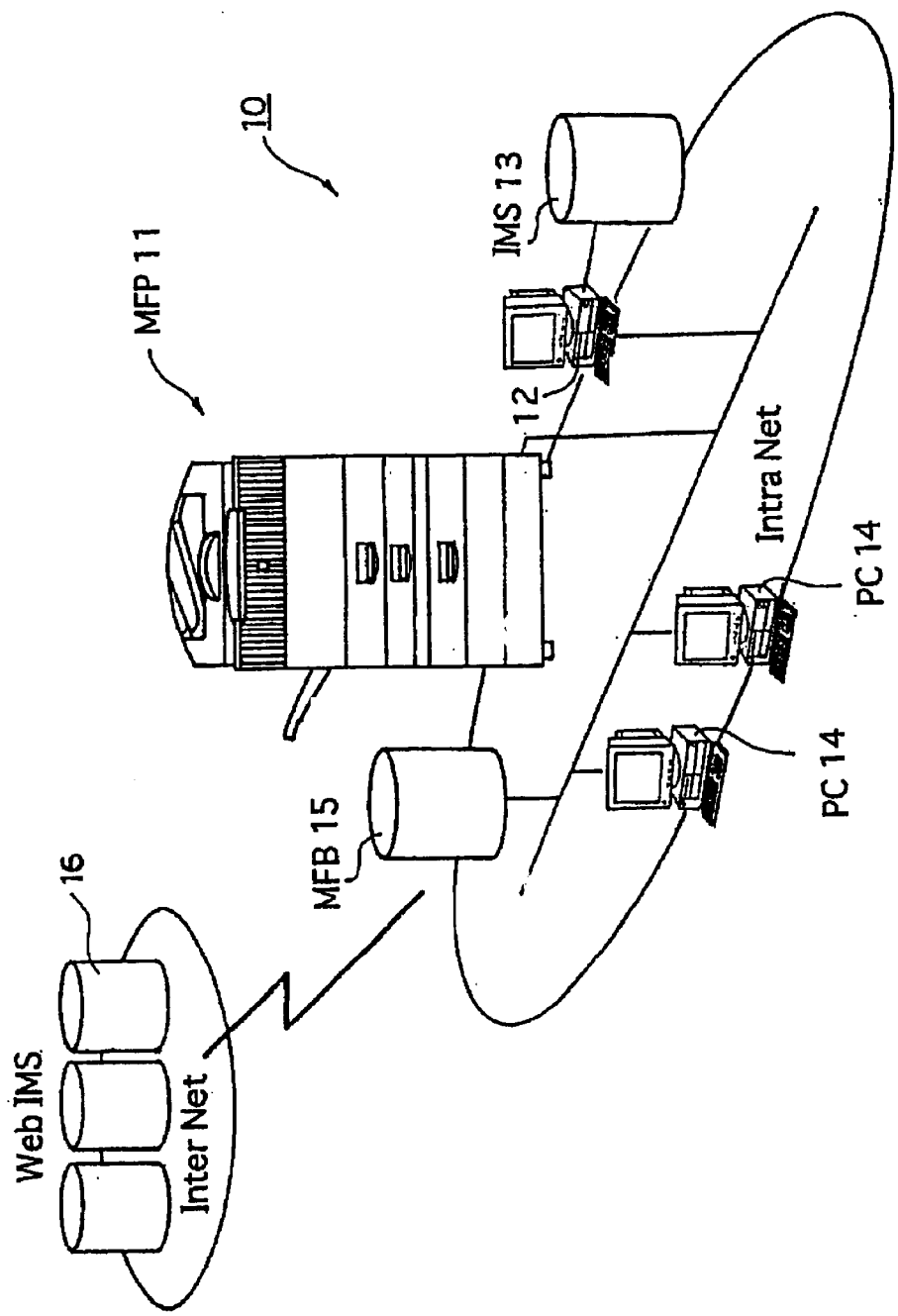
FIG. 1 is a diagram of a file system according to the present invention illustrating an outline of the constitution of the system.

Referring now to the drawings, wherein like reference numerals designate identical or corresponding parts throughout the several views, in FIG. 1 a data management system 10 is configured to function as a data backup system for backing up data which is processed with a processing unit by a user and also to function as a file system if the user so desires. The data management system 10 includes a high level function digital copying machine (MFP: Multi-function printer) 11 connected on an intranet in a user's office, a server machine 12, a mass storage device (IMS: Infinite memory server) 13, a personal computer (PC) 14, a connecting device (MFB: Multi-function box) 15, and a mass storage device (Web IMS) 16 on the Internet for providing services of a service provider described later.

Figure 2:
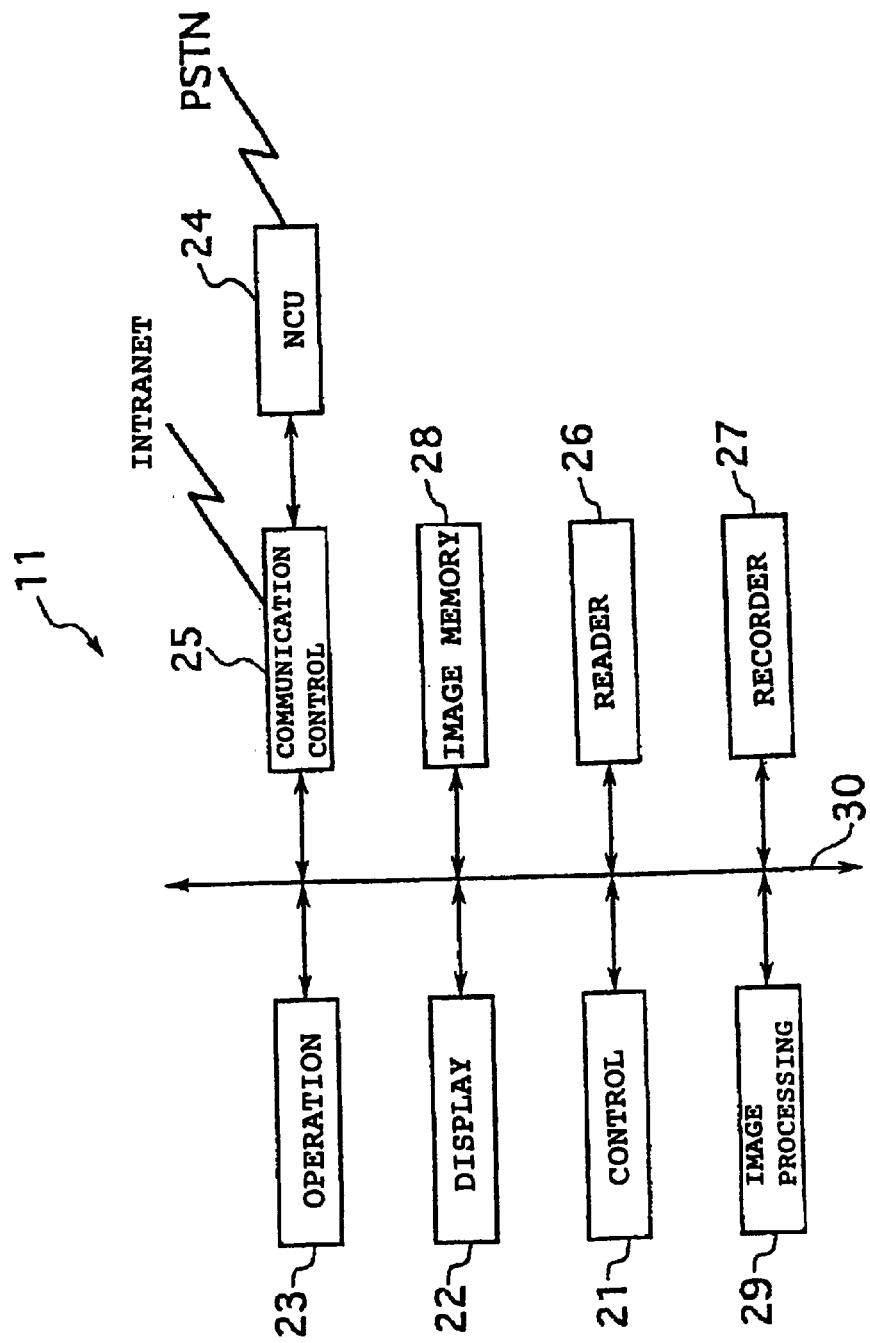
FIG. 2 is a block diagram of a processing unit in the file system.

The copying machine 11 includes, as illustrated in FIG. 2, a control section 21 which integrally controls components of the machine 11, and a display section 22, an operating section 23, an NCU section (a network control unit) 24, a communication control section 25, a reader 26, a recorder 27, an image memory section 28, and an image processing section 29, which are all connected to the control section 21 via a bus 30. The control section 21 executes various types of processing of the present invention and various functions described later by storing various information such as driving conditions of the components of the machine 11 and management data according to a control program read out from a ROM (read only memory) by a built-in CPU (central processing unit) and by using a RAM (random access memory) in which required data is stored for the operation.

Figure 3:
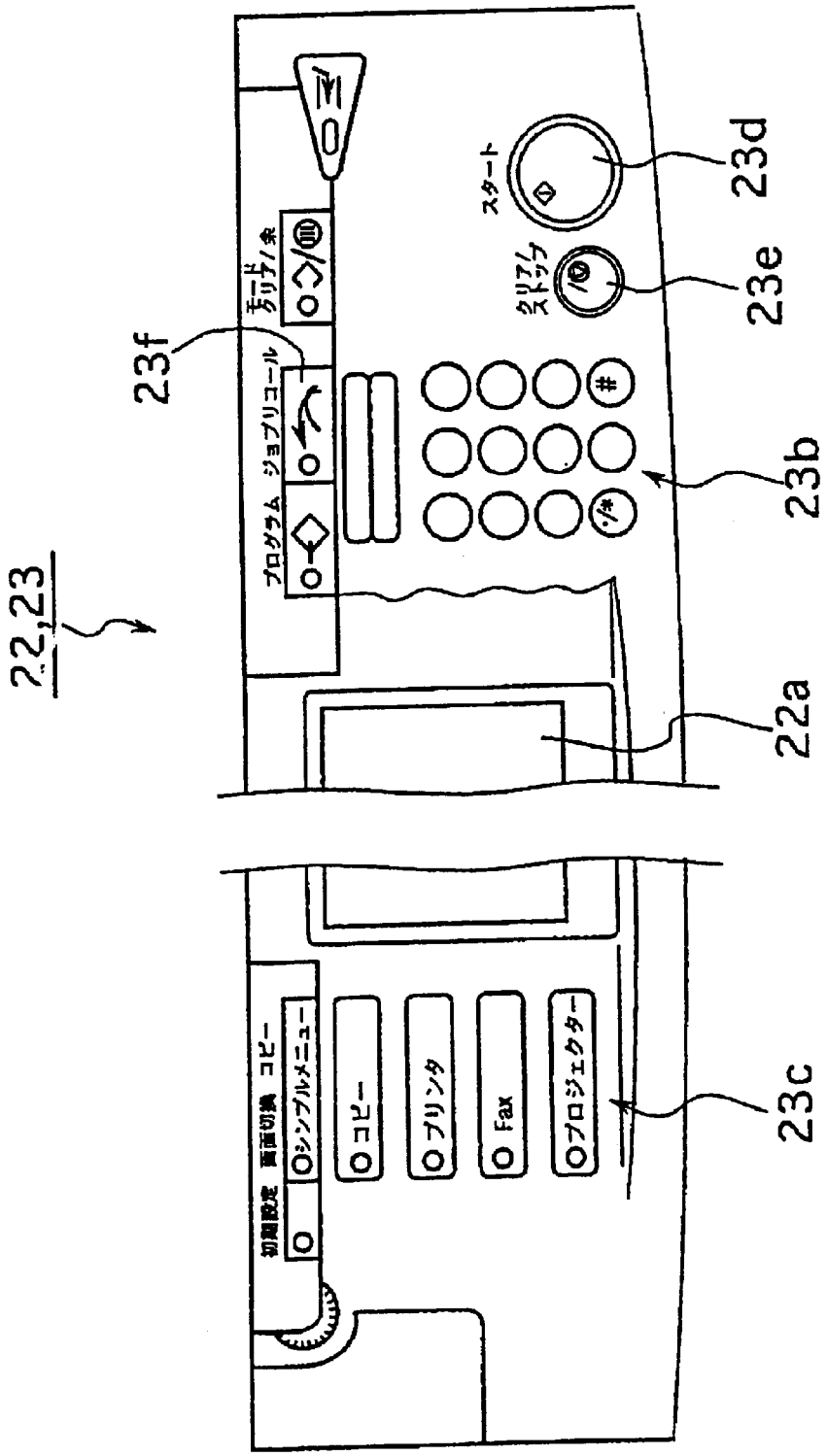
FIG. 3 is a top view illustrating a display device and an operation device of the processing unit.

The display section 22 and the operating section 23 are arranged in an operation and display panel provided on a top of a front portion of the machine body illustrated in FIG. 3. As illustrated in the drawing, a touch panel display operation LCD (liquid crystal display) 22a, a ten key 23b, function keys (F keys) 23c, a start key 23d, and a stop key 23e are arranged in the operation and display panel for input operations of user settings, instructions or the like and for displaying various information such as driving conditions, a device status, or input information. In addition, a slot for receiving an ID card for reading or writing various information from/to the ID card is arranged in the operation and display panel.

The communication control section 25 is connected to the NCU section (a network control unit) 24 for connecting or disconnecting a line by executing given line controls when making an outgoing or incoming call via a PSTN (public switched telephone network). The communication control section 25 modulates or demodulates image data or various procedure signals with a built-in modem and performs a facsimile network communication (sending or receiving processing) via the NCU section 24. Further, the communication control section 25 is connected to an intranet via an I/F (an interface) which is not illustrated and performs transmission (sending and receiving) of document data, such as image data and character data.

Figure 4:
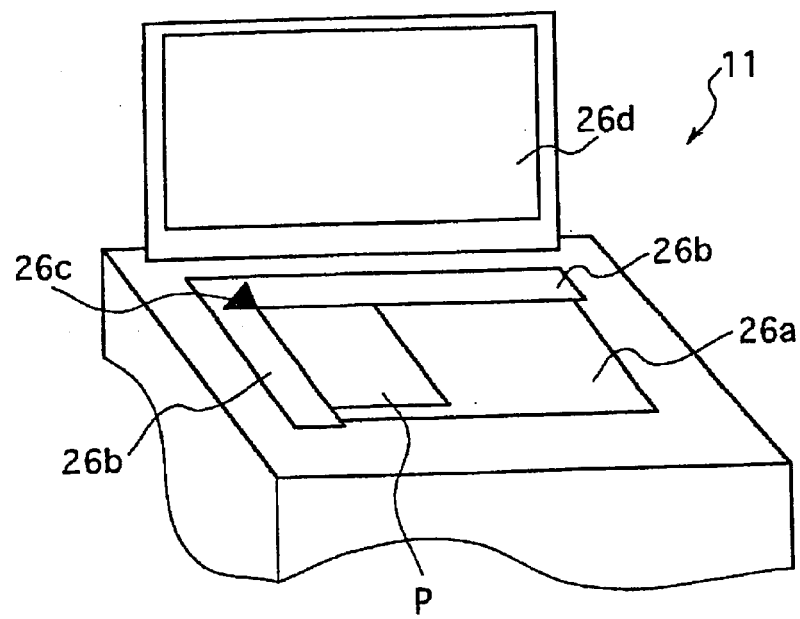
FIG. 4 is a perspective view illustrating a reading device of the processing unit.
Figure 5:
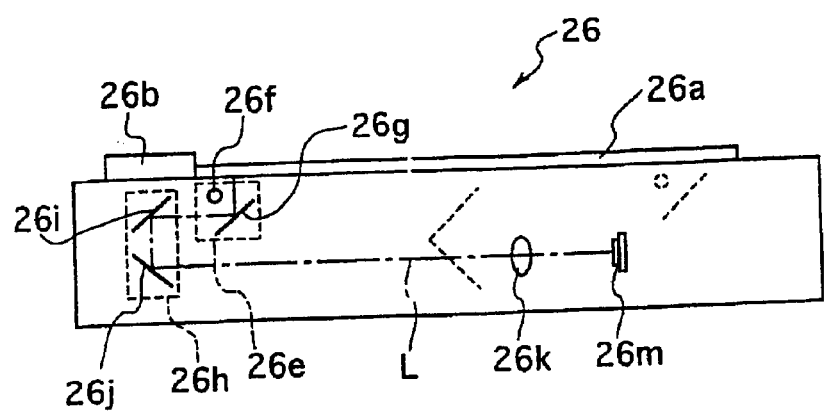
FIG. 5 is a perspective side view of the reading device.

The reader 26 is configured, as shown in FIGS. 4 and 5, such that a document P is positioned so that an angle of the document matches a document position reference 26c formed by an included angle of a document scale 26b on a contact glass 26a having a large area. The reader 26 reads image data to be transmitted or copied from the document P with the document P being put in close contact with the contact glass 26a by a pressurizing plate 26d, which is provided on the contact glass 26a so as to open and close to be put in contact with and separated from the document P. A light beam is emitted from an exposing lamp 26f which extends in a horizontal scanning direction on a first carriage 26e. The first carriage 26e moves in a vertical scanning direction on the document P which has been set. A reflected light from an image surface of the document P is deflected by a first mirror 26g and is then reversed by a second mirror and a third mirror 26i and 26j mounted on a second carriage 26h. The second carriage 26h moves at half the speed of the first carriage 26e to keep a constant optical path length L of the reflected light. The reflected light is projected on a CCD (charge coupled device) 26m through an imaging lens 26k and the image data of the document P is read by a photo-electric conversion. The reader 26 may have an automatic document feeder (ADF) for automatically conveying documents P set on a document table onto the contact glass 26a and for discharging them to an output table after reading the documents instead of the pressurizing plate so that a plurality of documents P can be automatically processed.

The recorder 27 records an image on a sheet, for example, with 400 dpi density and 256 gradations in accordance with a known electrophotographic recording method. The recorder 27 records the image on the sheet according to image data which has been read or received and stored in bit mapping in the image memory section 28 which includes a hard disk unit. While the details are not described here, in the known electrophotographic method, an electrostatic latent image according to read or received image data is formed by optically writing the data on a photosensitive body which has been charged while being rotated, and then toner is attached to the photosensitive body for developing the latent image with the toner. A sheet having an appropriate size for the recording image or a specified size is conveyed from a feed cassette to transfer the developed toner image thereupon. Then, the sheet carrying the toner image is discharged outside the machine 11 after the toner image is fixed. The recorder 27 may be an ink jet type, a thermal recording type, or any other type.

The image processing section 29 compresses and encodes image data to be sent, and decompresses and decodes received image data. The image processing section 29 further executes converting processing to convert character data (code data) of documents created by a user, using the PC 14, into image data by bit-mapping the character data in the image memory section 28 as required. The image data compression performed by the image processing section 29 is intended to decrease the amount of data, and therefore, any known method may be applied if both of the copying machine 11 and the server machine 12 can process the data. For example, a GBTC (generalized block truncation coding) method can be applied to a compression of a bit map data of 400 dpi with 8 bits per pixel in the image memory 28.

Accordingly, the copying machine 11 includes a processing unit having a transmission function for performing a facsimile network communication in which image data is transmitted and for performing a data communication in which document data is transmitted between PCs 14. The processing unit also has a copying function for recording read image data on a sheet and outputting the recorded sheet, and a recording function for recording received document data and outputting the recorded sheet. Thus, the copying machine 11 serves as a facsimile device, a printer and/or a scanner as well as a copying machine.

The ID card set in the operating section 23 of the copying machine 11 contains information such as telephone numbers for facsimile communication, addresses of the PC 14, processing conditions such as a reduction ratio for copying, a user ID, a user name and so forth.

The copying machine 11 reads the processing conditions contained in the ID card when the start key 23d is depressed after a function is selected by a depression of an F key 23c of the operating section 23 such that the user can use various functions of the machine 11 easily. Further, the user ID is read from the ID card (or the user ID is received with document data for a use with the PC 14) and management information, such as the processing function which has been used or the number of processed sheets, is stored in a RAM of the control section 21 for each user ID so that it can be used for accounting processing. Therefore, when the copying machine 11 performs desired data processing to document data with the provided functions according to a processing instruction (including processing instructions from the PC 14 and recording instructions of received document data to be locally processed in the machine 11) inputted by a user, the copying machine 11 appropriates and adds the user ID to the processed document data as additional data (specific information) without requesting an input of the user ID, when sending out the document data to the server machine 12 (described later).

If the copying machine 11 is operated without setting the IC card therein (without input of the user ID), the copying machine 11 reads out a shared user ID which has previously been allocated to the copying machine 11 for use for a shared cost at accounting processing from a nonvolatile RAM so as to use the shared user ID as the user ID. Then the copying machine processes the document data as shared document data.

The connecting device 15 functions as a network hub of terminal devices such as the copying machine 11, the server machine 12, and the PCs 14. The connecting device 15 forms a local area network (LAN) environment by relaying data communication between the terminal devices. The connecting device 15 further connects to other local area networks to form an intranet environment. The connecting device 15 further connects to the Internet enabling a user to use various types of information by accessing a service provider company on the Internet from the copying machine 11, the server machine 12, or the PC 14.

The PC 14 includes a CPU, a memory (ROM, RAM, etc.), an I/O (input-output) circuit or the like. The PC 14 can be used as a system for performing various types of processing, such as creation of a document or an image, by arithmetic operations according to an application program read out from a hard disk unit (a memory medium) by operation of a keyboard or a mouse while viewing a display. Document data created by the PC 14 can be printed out with various functions of the copying machine 11 by sending out a processing instruction together with a user ID to the copying machine 11 or be sent to a facsimile machine at an entered destination. Further, the PC 14 can receive image data which is received by the copying machine 11 from a facsimile machine, or image data read by the copying machine 11.

The mass storage device 16 is connected to the Internet via a communication control unit of a service provider. When an access input from a registered user is received, the communication control unit enables the mass storage device 16 to be read or written according to a control program read out from a memory device by a CPU. When a storage instruction is received, the mass storage device 16 stores document data following the instruction, which is associated with additional data (specific information) as received. When a reference instruction for the document data for storing is received immediately after the access, the mass storage device follows the reference instruction. For example, if a transfer instruction is sent for document data whose address is specified by specification of the additional data (user ID) by the server machine 12, the mass storage device 16 reads out document data of the address and sends out the read document data.

Figure 6:
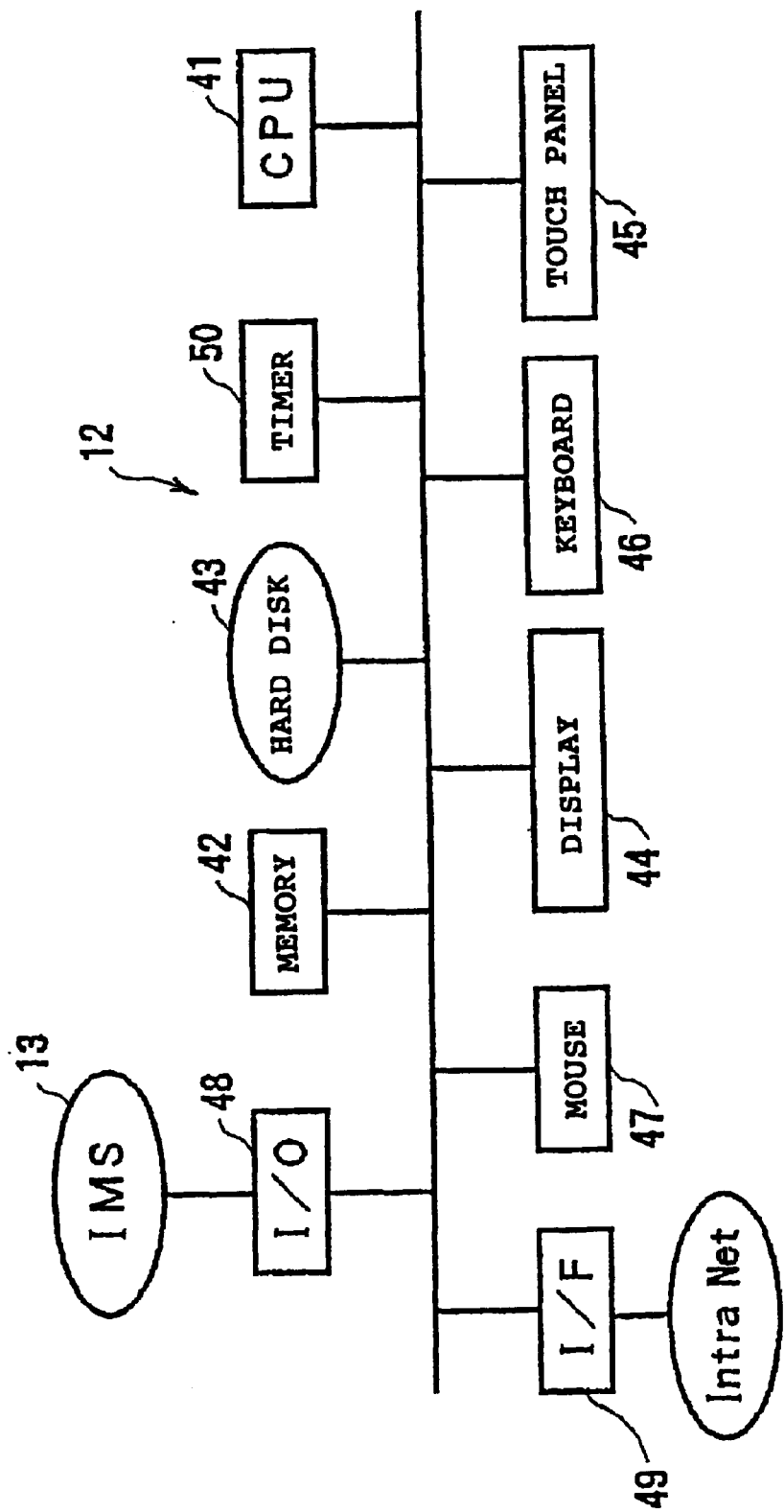
FIG. 6 is a block diagram illustrating a main portion constituting a memory unit in the file system.

As illustrated in FIG. 6, the server machine 12 includes a PC having a CPU 41, a memory (ROM, RAM, etc.) 42, a hard disk unit (a memory medium) 43, a display 44, a touch panel 45, a keyboard 46, a mouse 47, an I/O (input-output) circuit 48, a network interface 49, and a timer facility 50. The PC can be used like the PC 14. The server machine 12 executes various types of processing of the present invention while integrally controlling the components 42 to 49 of the server machine 12 by constructing various drivers, such as a file driver 51 or a display driver 52 illustrated in FIG. 19, according to an application program read out from the hard disk unit 43 by the CPU 41. The server machine 12 is connected to the mass storage device 13 via the input-output circuit 48 and to an Ethernet cable to form an intranet via the network interface 49. A nonvolatile RAM in the memory section 42 stores data necessary for receiving backup services of a service provider with a connection to the Internet, such as an address of the service provider, a registered ID (a user ID for receiving the services, which can be identical to a user ID in the ID card for using the copying machine 11), and a password, in order to receive the services. The network interface 49 may function as a modem to establish a connection to the service provider via a telephone line without using the intranet.

The server machine 12 is configured to receive data to be processed by the copying machine 11 via the intranet and to send the data to the mass storage device 13 at the same time so as to store the data as received in a memory device of the mass storage device 13. At this point, the used capacity (i.e., the used storage capacity) of the mass storage device 13 is determined. When the used capacity is found to exceed a predetermined amount, a given amount of document data is read out from the mass storage device 13 sequentially in order of age. The given amount of document data is then transferred to the mass storage device 16 to be stored therein by accessing the service provider on the Internet by using the address of the service provider, the registered ID, or the password in the memory section 42, before or after executing a storage of the document data. In addition, according to a request by the user, the server machine 12 reads out a part of the document data stored in the mass storage device 13, for example, a thumbnail image for the first page of the document data, or additional data added to the document data. The server machine 12 displays the read data on the display 44 in a manner in which the user can select desired document data. The selected document data is read out from the mass storage device 13 and may be transferred to the copying machine 11 so as to be printed and output as a hard copy of the document data. Thus, the server machine 12 functions as a file unit so that the data management system 10 serves also as a file system. When reference to document data stored in the mass storage device 16 is required, the server machine 12 accesses the service provider on the Internet by using the address of the service provider, the registered ID, or the password in the memory section 42 to process the data in the mass storage device 16 in the same manner. In other words, the server machine 12 functions as a storage management device and an output management device.

Figure 7:
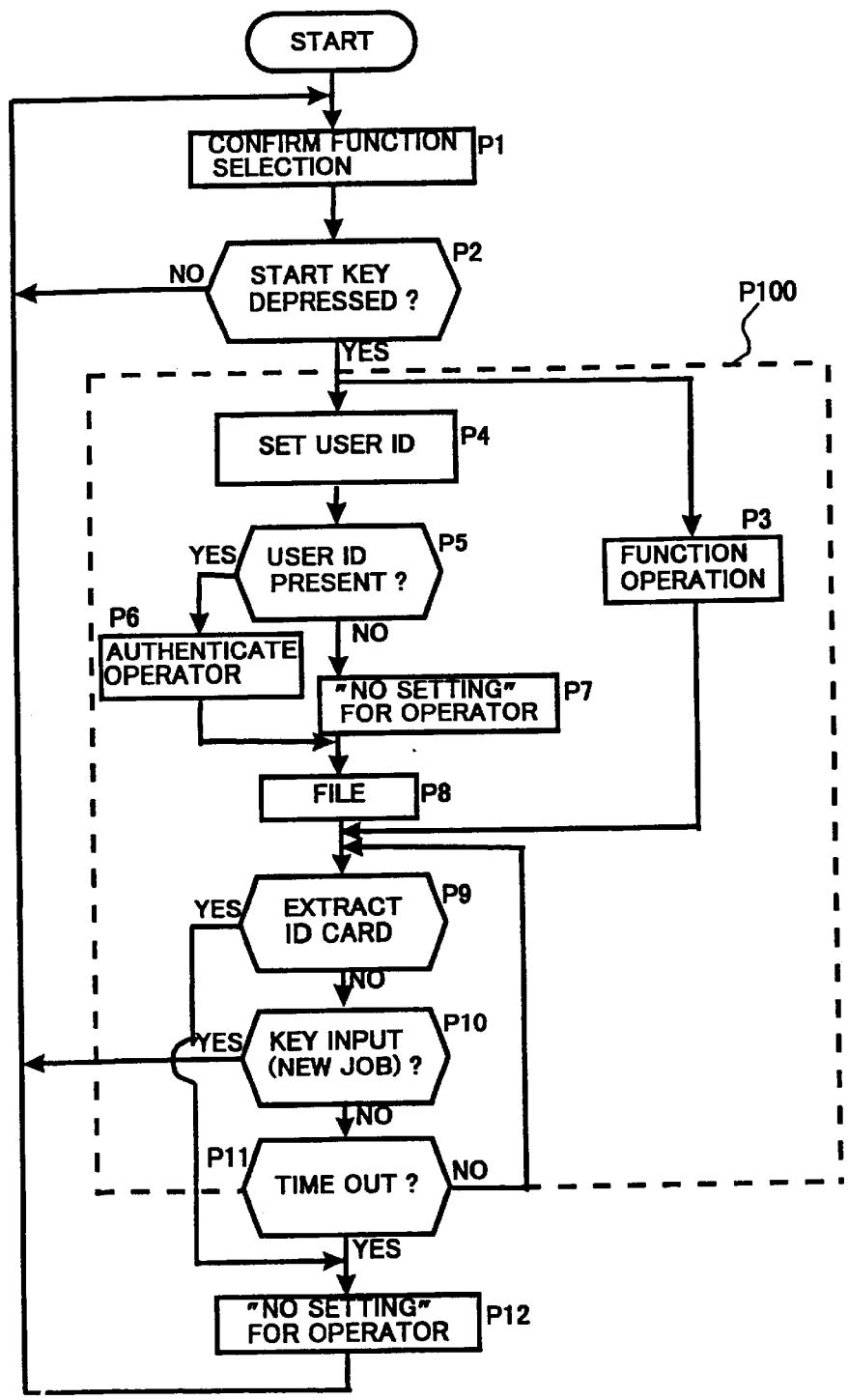
FIG. 7 is a flowchart showing a part of the file processing of the file system.

Specifically, when a copying operation is selected by an operation of the operating section 23 of the copying machine 11, as illustrated in a flowchart in FIG. 7, by a depression of the start key 23d directly (Steps P1 and P2), for example, the copying machine 11 reads and copies document data from a document which has been set to the reader 26 (Step P3), and in concurrence with this operation, if the ID card is set to the operating section 23, the copying machine 11 authenticates an operator (a user of the copying machine 11) based on the user ID read out from the ID card (Steps P4 and P5). If the user ID cannot be obtained, a shared ID read from the nonvolatile RAM of the control section 21 is assumed to be a user ID and the authentication of the operator is set to "No setting" (Steps P4, P5, and P7).

Figure 8:
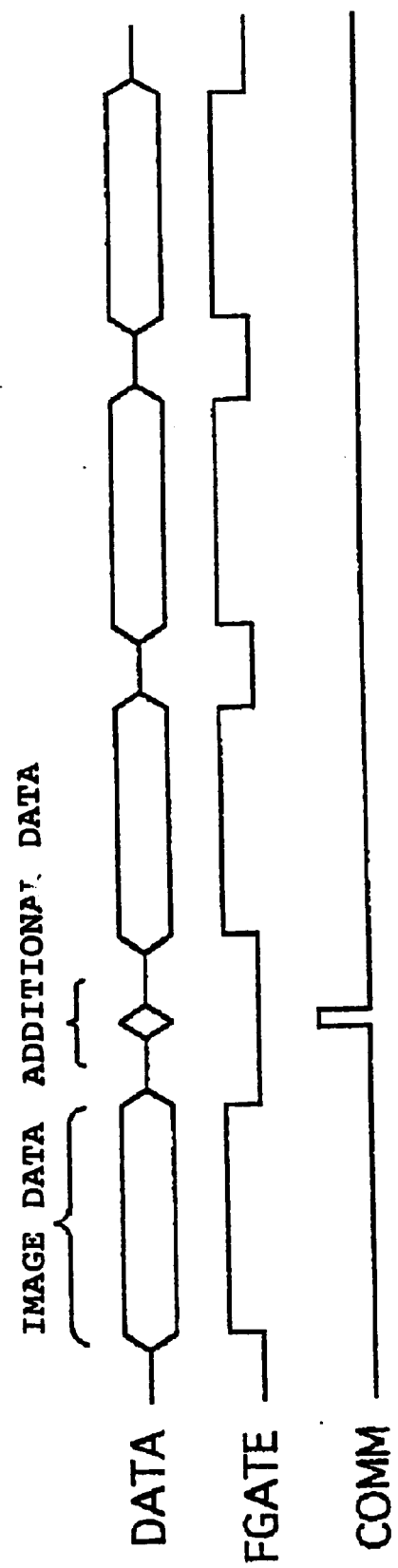
FIG. 8 is a timing chart for the addition of additional data to processing data in the file system.
Figure 9:
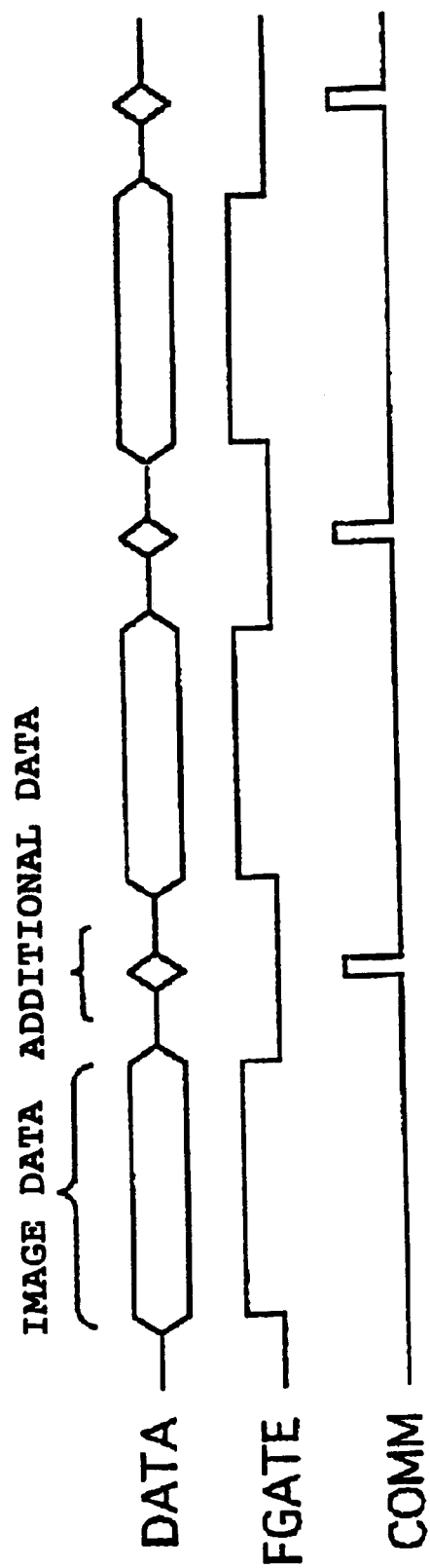
FIG. 9 is a timing chart showing a second way in which additional data is added to the processing data in the file system.

Additionally, concurrently with processing the selected function, the copying machine 11 encodes and compresses the same document data by the image processing section 29, adds processing date and time information (timed with a timer facility), processing conditions (a reduction ratio, etc.), and the user ID, to the document data as additional data (e.g., code data). Then the copying machine 11 sends out the encoded and compressed document data with the additional data to the server machine 12 to be stored in the mass storage device 13 on the intranet (Step P8). During this process, the document data is temporarily stored in the image memory section 28 of the copying machine 11, and is then sent to the server machine 12 while being synchronized with an FGATE signal indicating an image area. In addition, the additional data is sent to the server machine 12 synchronized with a COMM signal indicating an information area. The additional data is sent, as illustrated in FIG. 8, in a form in which the additional data is added only to the first or last document data even if a document P ranges over a plurality of pages. Thus, the document data and the additional data are associated with each other and are integrated in a single process to save the storage space in the mass storage device 13 or 16. When processing conditions are desired to be grasped in more detail, such as for example, when the copy density is adjusted per page in copying processing, additional data may be added to the document data per page to be sent to the server machine 12, as illustrated in FIG. 9.

Thus, document data which is processed by the copying machine 11 is automatically stored in the mass storage device 13 or 16 without a need for special input operations (i.e., regardless of a presence or absence of a storing instruction input) except for the operations for executing its processing, with the additional data for specifying the document data automatically added (associated) thereto. Even for document data to be processed without a user ID, the copying machine 11 stores the document data in substantially the same manner, without requesting an input of a user ID, using a shared ID. Subsequently, when the IC card is extracted, the copying machine 11 determines that the operator terminates the processing (Step P9). Also, when detecting that a preset time is elapsed based on the time registered by the timer facility for a time period from an end of reading the document which has been set in the reader 26, the copying machine 11 determines that the operator has terminated the processing (Step 11). If either of the conditions is satisfied, the copying machine 11 clears the user ID for specifying the operator who has performed the document data processing and sets (authenticates) a shared ID of a default, which is intended for use by a user who cannot obtain a user ID, as "No setting" of an operator, in order to prevent a different user from using an identical user ID (Step P12). In these Steps P9 and P11, when a start instruction of new processing is issued by a depression of another key input, such as, for example, the F key 23 or the start key 23d, before the preset time is elapsed, with the IC card being set (Step P10), the process returns to Step P1, keeping the identical user ID, to repeat the same processing.

Therefore, when the operator changes, a user ID is obtained again and thereby the exchange of operators is reliably detected and the user ID is correctly added to the document data.

Furthermore, if an "Undo" button (different from the "Job recall button" 23f in FIG. 3) arranged in the operating section (the operator panel) 23 for specifying an input of a storage inhibition instruction is depressed between the Step 2 and the Step 11 (Step P100), the copying machine 11 skips the steps of storing the document data in the mass storage device 13 or 16 (i.e., the Steps P4–P11) and continues only the processing of the provided functions in the control program. If the "Undo" button is depressed after the document data is started to be stored by the execution of Step P8, the document data having been stored or under storing processing is invalidated for reading and is deleted by deleting the additional data of the document data before an execution of the next processing instruction, so that storing the document data is canceled. When the "Job recall button" 23f is depressed to cancel the instruction of the copying processing, the same processing is performed as for the depression of the "Undo" button.

Accordingly, the document data, which is stored in the mass storage device 13 or 16 as backup data without a request for an input operation (except the operations performed by a user to use functions of the copying machine 11), can be deleted only by a depression of the "Undo" button of the operating section 23 between the Step P2 and the Step P11. Therefore, when copying a confidential image, for example, it can be easily avoided that the data of the confidential image is filed in the mass storage device 13 or 16 for reuses.

As the additional data to be sent from the copying machine 11 to the server machine 12, the copying machine 11 obtains transmission processing conditions for transmission, such as a telephone number and an address of a destination, and obtains processing conditions for copying (recording), such as conditions related to document sheets or recording sheets and conditions related to image processing on image data. Then, the copying machine 11 adds these conditions to the document data to be stored. The additional data can be any information useful for specifying processing. For copying processing, for example, the copying machine 11 allows for a user to select from the following functions in order to enhance the utility of copying processing: a copy density; an image processing mode (such as image quality correcting processing, etc.); a magnification ratio (for reduction and enlargement); post-processing of sheets (such as sorting and stapling sheets); two-sided copying; divide copying; collect copying; adding information of a date, a stamp or a page, which is printed on a sheet; and edited copying. The copying machine 11 receives (obtains) these image processing conditions as processing conditions together with the document and sheet conditions, such as the number of copying sheets, the document size and the direction of the document, which are automatically recognized in a range from the maximum A3 size to the minimum B6 size or selected according to settings by the user. Then the copying machine 11 adds the processing conditions and the documents and sheets conditions to the document data to be stored.

Figure 10:
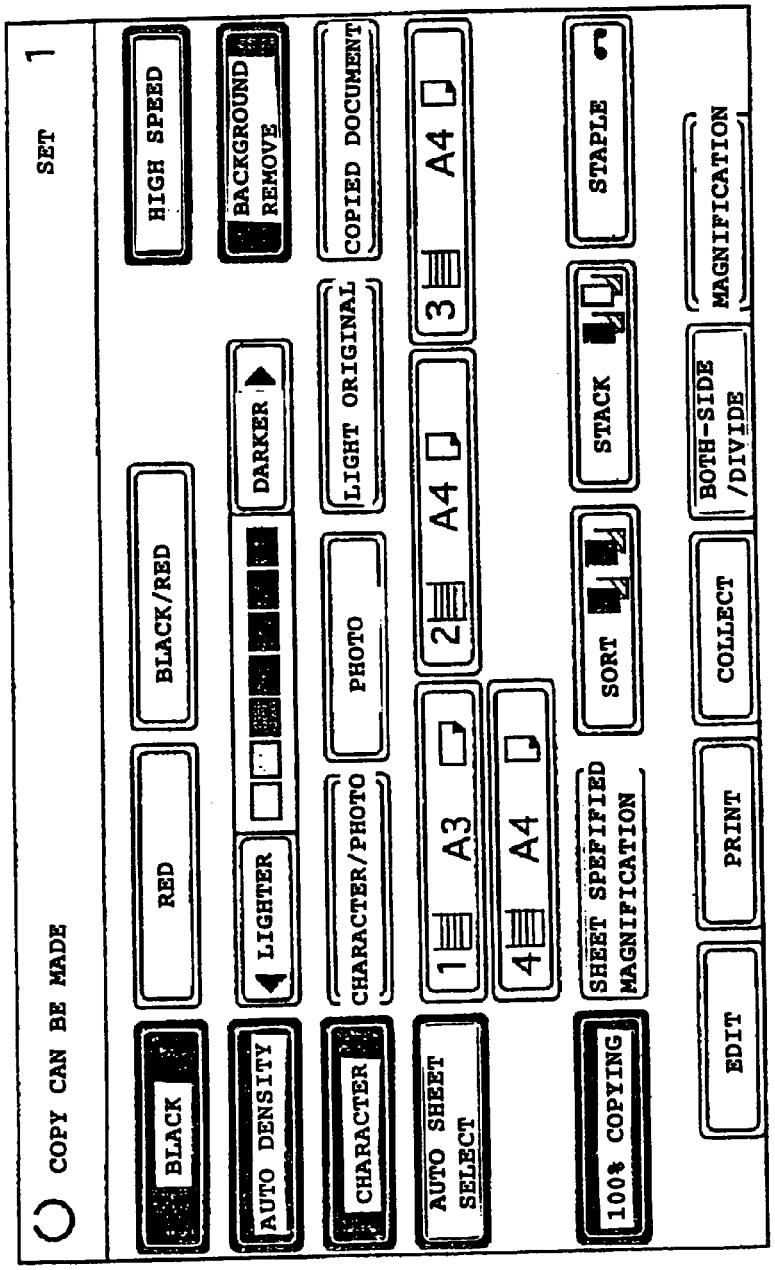
FIG. 10 is a top view illustrating a part of a display operation device of the processing unit for explaining the additional data to be processed in the file system.
Figures 11, 12:
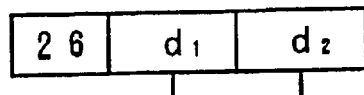
FIG. 11 is a list explaining the additional data for the file processing of the file system.
FIG. 12 is a list explaining one piece of the additional data of the file system.

In the copying machine 11, if the copy function is selected by a depression of the F key 23c instead of the start key 23d under the default copying conditions (automatic sheet selection, magnification ratio of 100%, automatic density, etc.), the copying machine 11 allows a user to set or select numeric values of the document and sheet conditions and the image processing conditions and various modes (corresponding to the commands shown in FIG. 11) by operations of a screen (FIG. 10) displayed on the display operation LCD 22a and the ten key 23b. For example, the number of copying sheets entered from the ten key 23b (the number of copies which can be set also in default) can be set as additional data, for example, by adding registration data for the entered number of copying sheets after the command 26H. When the registration data is, for example, a command like "26," "00," "01" is processed as illustrated in FIG. 12. As additional data of the document and sheet conditions or the image processing conditions entered from the display operation LCD 22a, automatic density setting data for an automatic copy density setting according to an image or density setting data for an arbitrary copy density setting in one of seven grades is set in a command 33H. Further, document type data for an image type such as character image photograph image, and character/photograph mixed image, is set in a command 38H, feeding sheet data for a sheet size and/or direction by designation of one of the feed cassettes for sheets to be used in a command 31H, and automatic sheet selection mode setting data for automatically selecting a feed cassette (sheets) according to a document size and direction and a magnification ratio for the document in a command 32H. Furthermore, magnification mode setting data for a magnification ratio such as a standard magnification determined by a document size and a sheet size, zooming in by a given percentage made by an arbitrary input setting, size magnification made by inputting settings for lengths of a document image and a copied image, and independent magnification made by inputting settings for magnification ratios different in vertical and horizontal directions, is set in a command 35H. Also, two-sided copying mode setting data for two-sided copying in which an image on a two-sided or single-sided document or two-page spread document is recorded on both sides of a sheet is set in a command 27H. Divide copying mode setting data for divide copying in which each image of a two-sided or two-page spread document is recorded on each single side of sheets is set in a command 28H. Collect copying mode setting data for collectively copying a plurality of images in which a plurality of document images are collected to a single side or both sides of sheets is set in a command 29H. Printing mode data for printing additional information such as a processing date, a stamp such as an "Urgent" or user mark, and the number of pages automatically added to a copied image is set in a command 2AH. Editing mode data for editing copying, for example, a double copy in which identical images are arranged on a single side, a margin creation in which margins are left in a center or edge portions of book documents, a binding margin creation in which a margin is left along a single edge of a sheet, erasing processing in which only a specified color is erased, is set in a command 34H.

Figure 13:
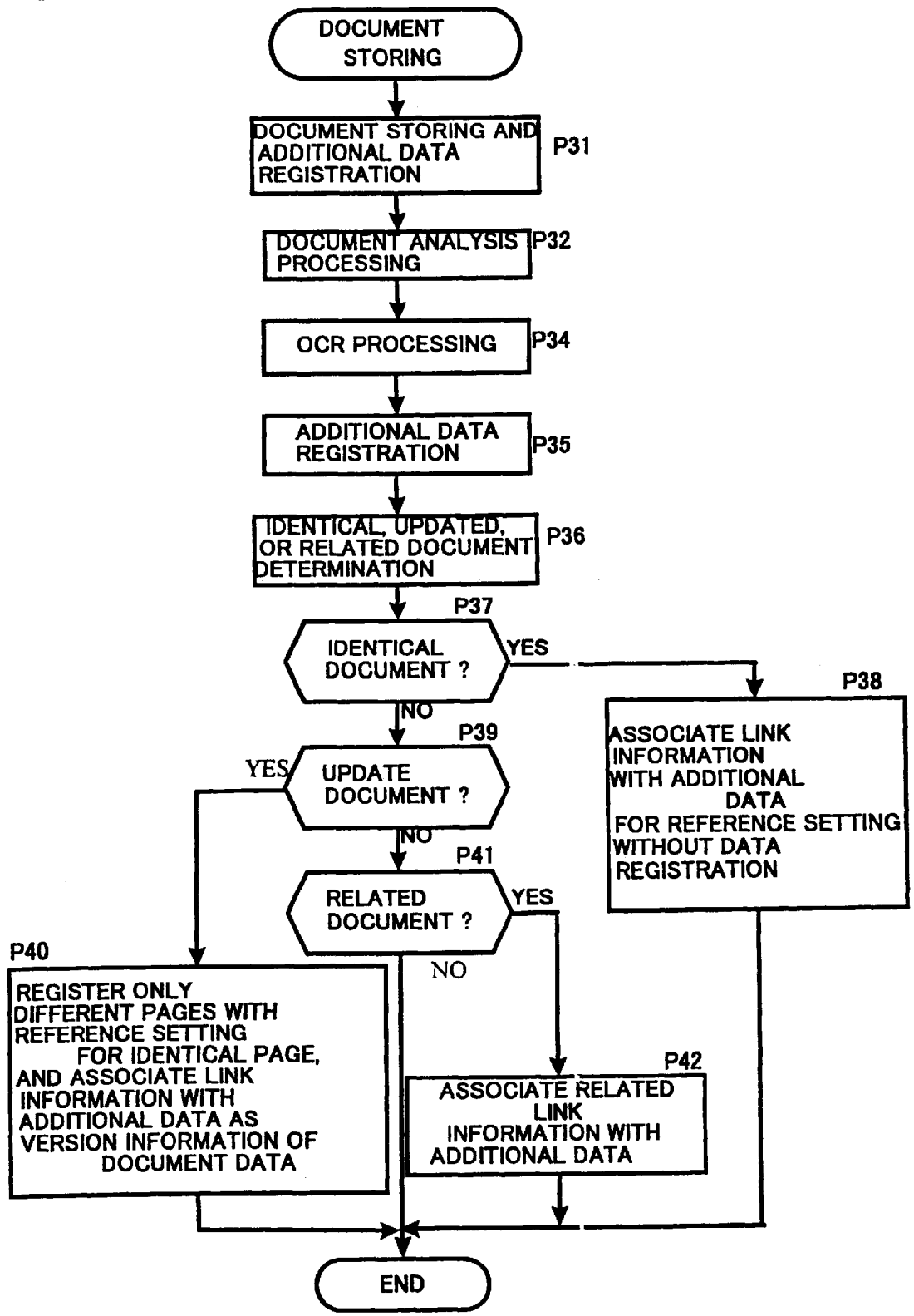
FIG. 13 is a flowchart for explaining a second part of the file processing of the file system different from the one in FIG. 7.

On the other hand, the server machine 12 has a database in which additional data is stored while being sectioned for each user ID in the hard disk unit 43 so that document data stored in the mass storage devices 13 and 16 can be easily retrieved. When additional data including appendix information (for example, a user ID, processing date information, processing conditions, and a title added to document data received from the PC 14) is received together with document data from the copying machine 11 via the intranet by an execution of the Step P8 in FIG. 7, as illustrated in FIG. 13, the server machine 12 stores the received document data in the mass storage device 13 as backup data of the received document data and further registers the additional data sent from the copying machine 11. Examples of the additional data sent from the copying machine 11 include processing date information, processing conditions, a title, or the like for specifying document data, in a field prepared for each type of additional data in the database of the hard disk unit 43, while associating them with a user ID, so that they can be readily used for retrieving document data (Step P31).

Figure 20:
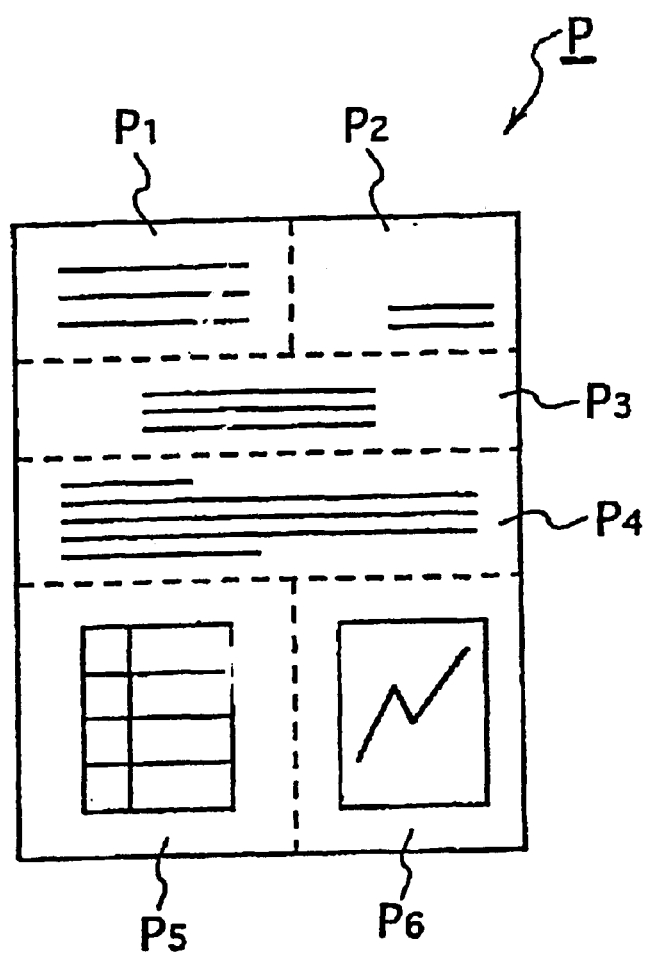
FIG. 20 is a diagram illustrating an example of a document to be processed in the file system.

The CPU 41 of the server machine 12 further performs document analysis processing, such as, correcting or complimenting document data, processing of discriminating document regions p1 to p4 or image regions p5 and p6 from each other in the document P illustrated in FIG. 20, in order to obtain additional data for further specifying the document data (Step P32). Furthermore, character data of the document data is encoded by being processed by optical character recognition (OCR), and then keywords frequently used in the sentences are obtained (Step P34). The keywords are then registered in the database so as to be associated with the stored document data (Step P35). Therefore, document data stored in the mass storage devices 13 and 16 can be easily specified according to the above described additional data.

Figure 16:
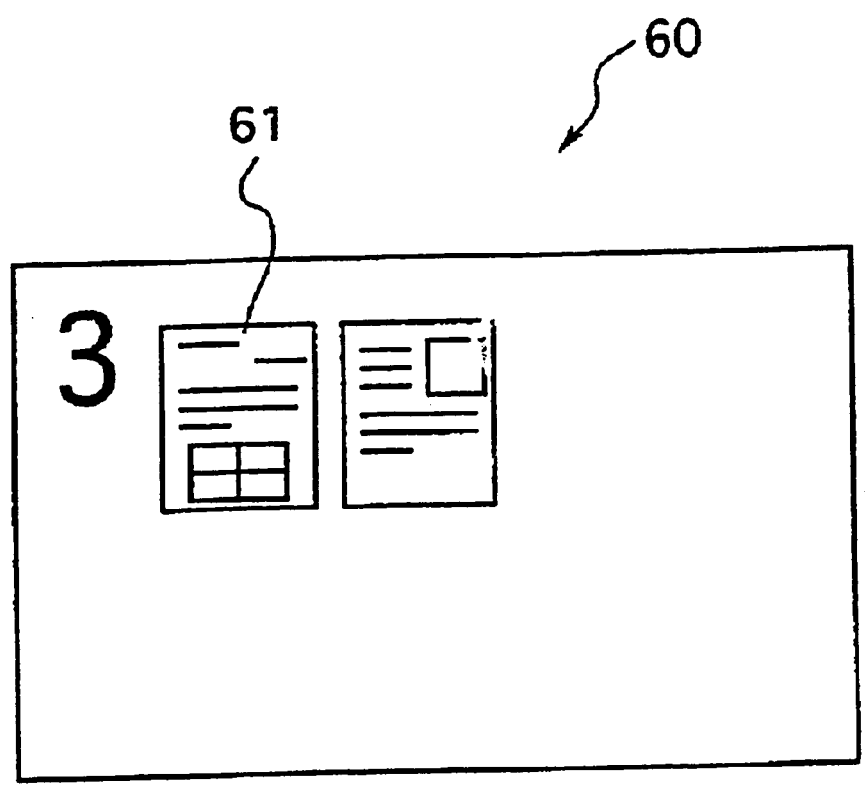
FIG. 16 is a partially enlarged view of the display screen of the file system.

Accordingly, in the server machine 12, if a user requests to reference document data by entering a user ID, the CPU 41 reads out the document data associated with the user ID from the mass storage devices 13 and 16 and additional data from the hard disk unit 43 of the sever machine 12 and displays them on the display 44 according to the reference instruction. At this point, as illustrated in a flowchart in FIG. 14, the CPU 41 creates a display screen in a calendar view format 60 which can be scrolled at a high or low speed with scroll buttons 59, as illustrated in FIG. 15. The CPU 41 also creates thumbnail images 61 as illustrated in FIG. 16 by reducing the first pages of the document data and displays the thumbnail images 61 according to each processing date (processing date information) (Step P51). If there has been issued an instruction for displaying related documents described later with relating them with the document data, the CPU 41 executes the corresponding processing (Steps P52 and P53), and further, if an operating instruction for retrieving document data is entered subsequently (Step P54) the CPU 41 executes various types of processing (Step P55). For example, if a user wants to check the contents of the document, selected document data can be displayed being expanded on the entire display 44 by a selection of the corresponding thumbnail image 61 with a click of a mouse 47 or with a depression of a displayed location of the thumbnail image 61 on the touch panel 45. The displayed image can be scrolled by manipulating the scroll button 59.

Figure 17:
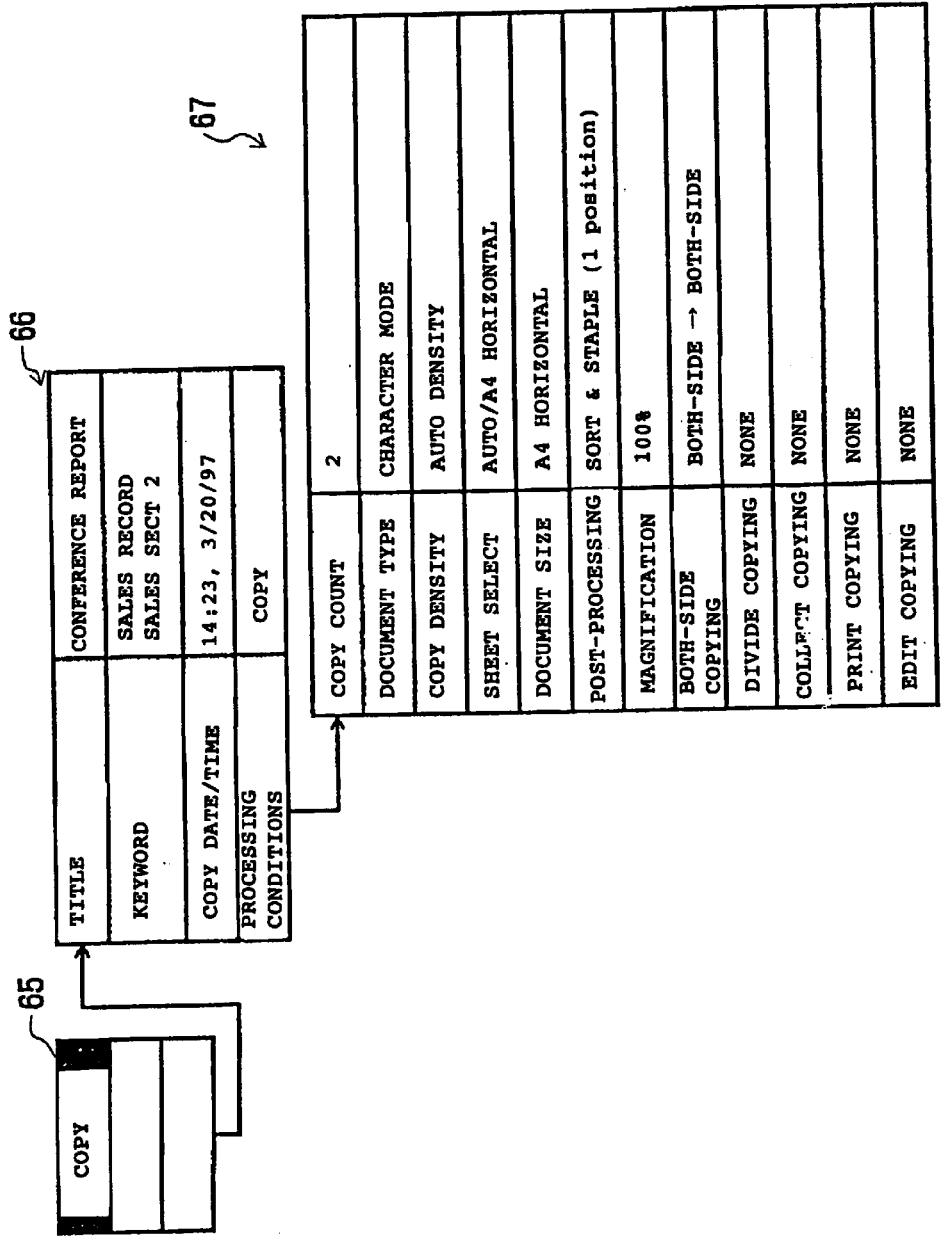
FIG. 17 is a diagram showing referencing processing, illustrating lists displayed in the display screen after selection of a retrieval button in the display screen of FIG. 15.

Furthermore, in the server machine 12, a series of lists illustrated in FIG. 17 can be sequentially displayed from the list in the upper left of the drawing by selecting the retrieval button 64 in the display screen in the calendar view format 60 of the display 44. In this manner, a user can check the contents of the document data processing. When a user wants to check the contents of document data of an image which is copied, an additional data list 66 is displayed including a title or keyword of the document data by selecting a copy button 65, so that the user can check the contents. Further, by selecting processing conditions in the list 66, an additional data list 67 is displayed, including the number of copies, a document type and so forth so as to be checked. In this processing, if a user requests to reference document data included in an arbitrary period by specifying the period as additional data by an input of date information, the server machine 12 executes reference processing using a calendar on which the period is displayed.

Figure 18:
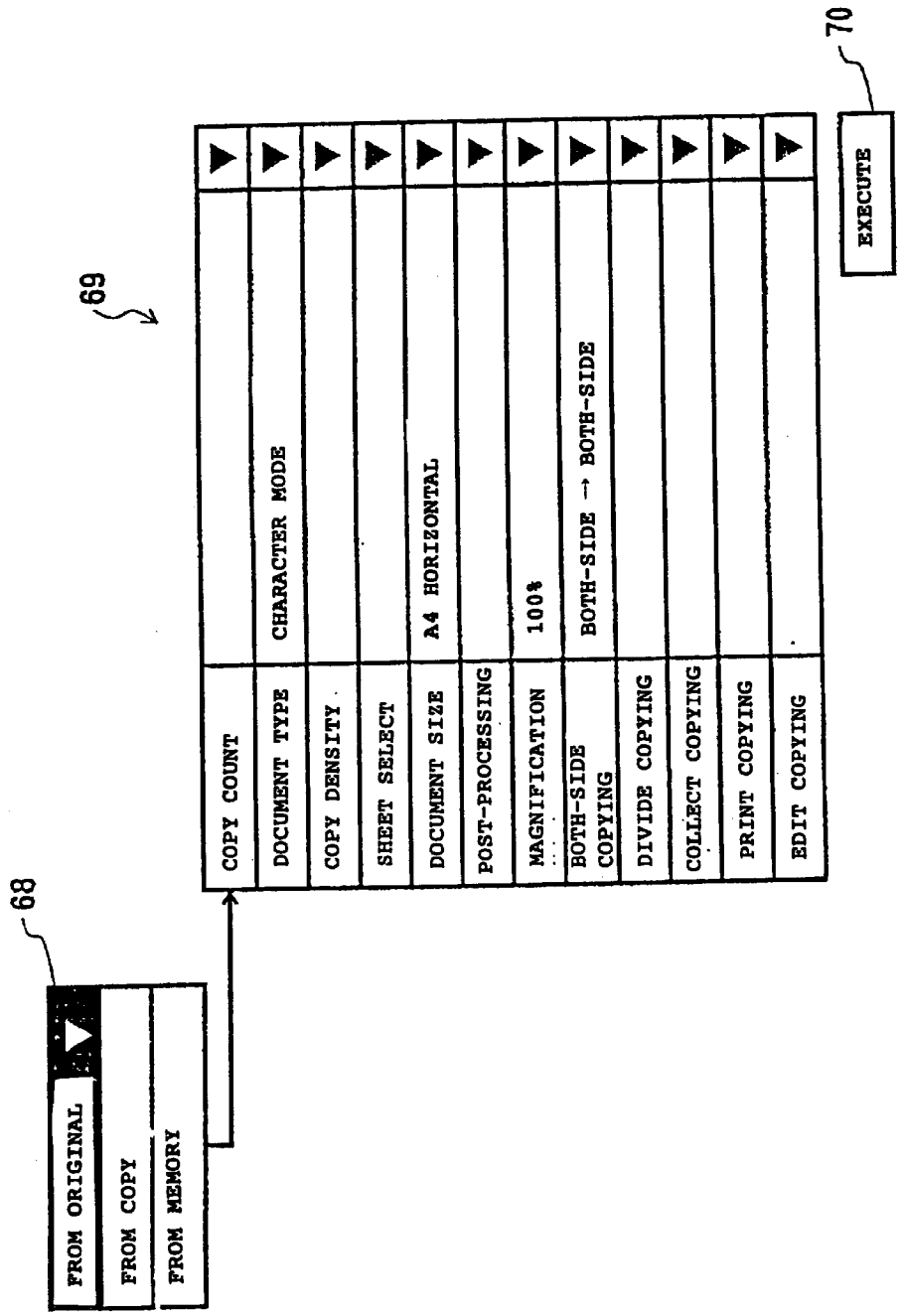
FIG. 18 is a diagram showing a second form of reference processing.

Additionally, if a user requests to reference document data by entering a user ID, the server machine 12 displays lists illustrated in FIG. 18 in the display 44 sequentially from the list in the upper left of the drawing by selecting a narrow-down button 63 illustrated in FIG. 15, and displays thumbnail images 61 on the calendar view 60 so as to be selected, with unnecessary document data omitted by selecting a type of the additional data. When the narrow-down processing is performed based on the additional data related to the document, by selecting a document button 68, a mode-settable conditions list 69 is displayed and a condition can be specified by clicking a "∇" mark in the right column of the document size, or the like. In a two-sided copying mode, for example, the server machine displays single-sided →two-sided, two-sided→two-sided, two-sided for left and right pages, and two-sided for two-sided pages so as to be selected. After selection, the server machine inverts the thumbnail images 61 in the calendar view 60 of the document data associated with the corresponding additional data by selection of an execution button 70 displayed on the same screen. If there are a plurality of corresponding document data, the additional data list 66 can also be displayed including a title or a keyword of the document data by selecting the retrieval button 64 and the copy button 65 illustrated in FIGS. 15 and 17 in the manner as described above. The user can then select a desired thumbnail image 61 and display the desired document data on the entire display 44 by selecting a call button 62.

Therefore, when a user desires to retrieve document data processed by the copying machine 11 for reusing the document data by selecting a menu for requesting reference, the server machine 12 can display thumbnail images 61 of the document data having an identical user ID, for example, from the latest one or from one at an arbitrary time, in a calendar format. In addition, by selecting the thumbnail image 61 of desired document data using a mouse, the desired document data can be properly read out (the entire document data which has already been processed is re-obtained) from the mass storage device 13. The document data is then sent to the copying machine 11 together with the additional data, and the copying machine 11 can restore the document data by decoding it using the image processing section 29 and can record it based on the additional data used for image processing. Thus, document data, which is stored as backup data when the document data is processed under certain processing conditions, can be reproduced so as to be available without input operations of the processing conditions.

Returning to FIG. 14, when desired document data is determined, by selecting the corresponding thumbnail image 61 with a mouse or on a touch panel and by selecting the call button 62 to specify an output destination (Step P56), the document data which has already been processed is readout from the mass storage device 13 so as to be displayed on the entire display 44. Alternatively, the document data can be restored by decoding it using the image processing section 29 and be recorded based on the additional data used for image processing by sending the document data together with the additional data to the copying machine 11 (Step P57), so that the document data which is stored as backup data when the document data is processed can be reproduced to be available without any input operations of processing conditions. Until a quit button is selected, the process returns to the Step P51 to repeat substantially the same processing. This processing terminates when the quit button is selected (Step P58). The user referencing the document data may enter the additional data for the image processing from the operating section 23 of the copying machine 11. Further, when a reference request is made for document data older than data stored in the mass storage device 13, the server machine 12 reads out an address of a service provider, a registered ID for each user ID, and a password from the built-in nonvolatile RAM. The server machine 12 also accesses the service provider on the Internet to send out a reference instruction of the document data, by which the mass storage device 16 on the Internet can be treated in substantially the same manner as the mass storage device 13 for referencing the stored document data. The server machine 12 can also reference shared document data which is processed without an input of a user ID and processed while being associated with a shared ID, according to a reference instruction of the shared document data, under the condition that a user ID used for the copying machine 11 is entered, by considering the shared ID for the copying machine 11 as the user ID used for the reference.

Figure 19:
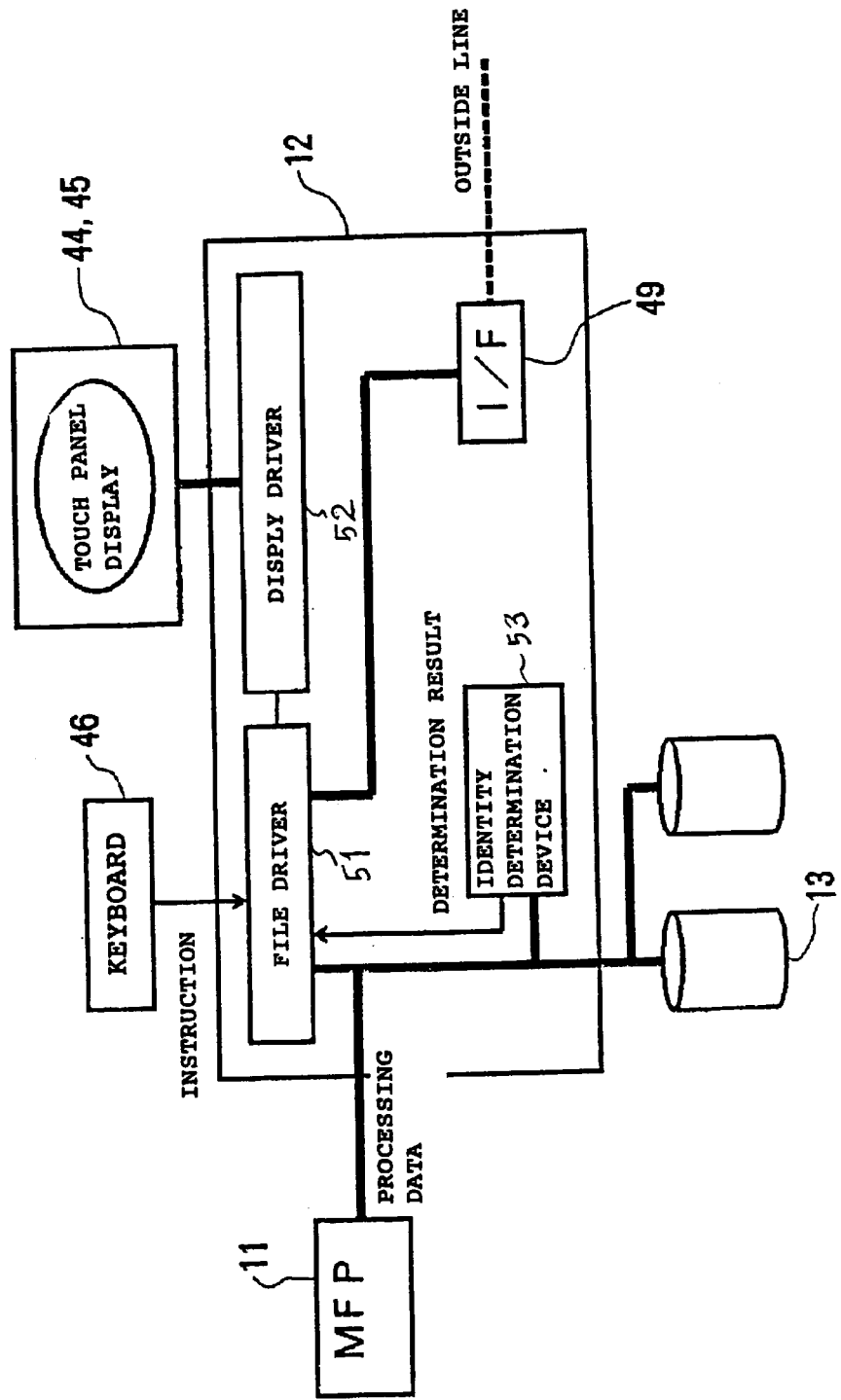
FIG. 19 is a block diagram for transmitting data to be processed in the file system.

In this processing, the CPU 41 of the server machine 12 includes an identity determination device 53 illustrated in FIG. 19, which checks whether or not the document data sent from the copying machine 11 (i.e., the new document data) has some relation to the document data already stored (i.e., the old document data) in the mass storage device 13 or 16 associated with the identical user ID in the database. When it is determined that the document data has some relation, link information is added to both the new and old document data (in other words, extending a relation) before the new document data is stored. While the CPU 41 functions as the identity determination device 53 immediately after the document data is received in this embodiment, the CPU 41 may be configured to function as the identity determination device 53 during a particular time period such as at night or any time the copying machine 11 will not be used.

Specifically, returning to FIG. 13, after keywords are obtained by applying the OCR processing to the document data received from the copying machine 11 and the keywords are registered to the database (Steps P34 and P35), the identity determination device 53 determines whether or not the new document data has some relation to the old document data. For example, the identity determination device 53 determines whether the new document data corresponds to a document identical to the old document, whether the new document data corresponds to an updated version of the old document, or whether the new document data corresponds to a related document having some relation to the contents of the old document (Step P36).

Figure 14:
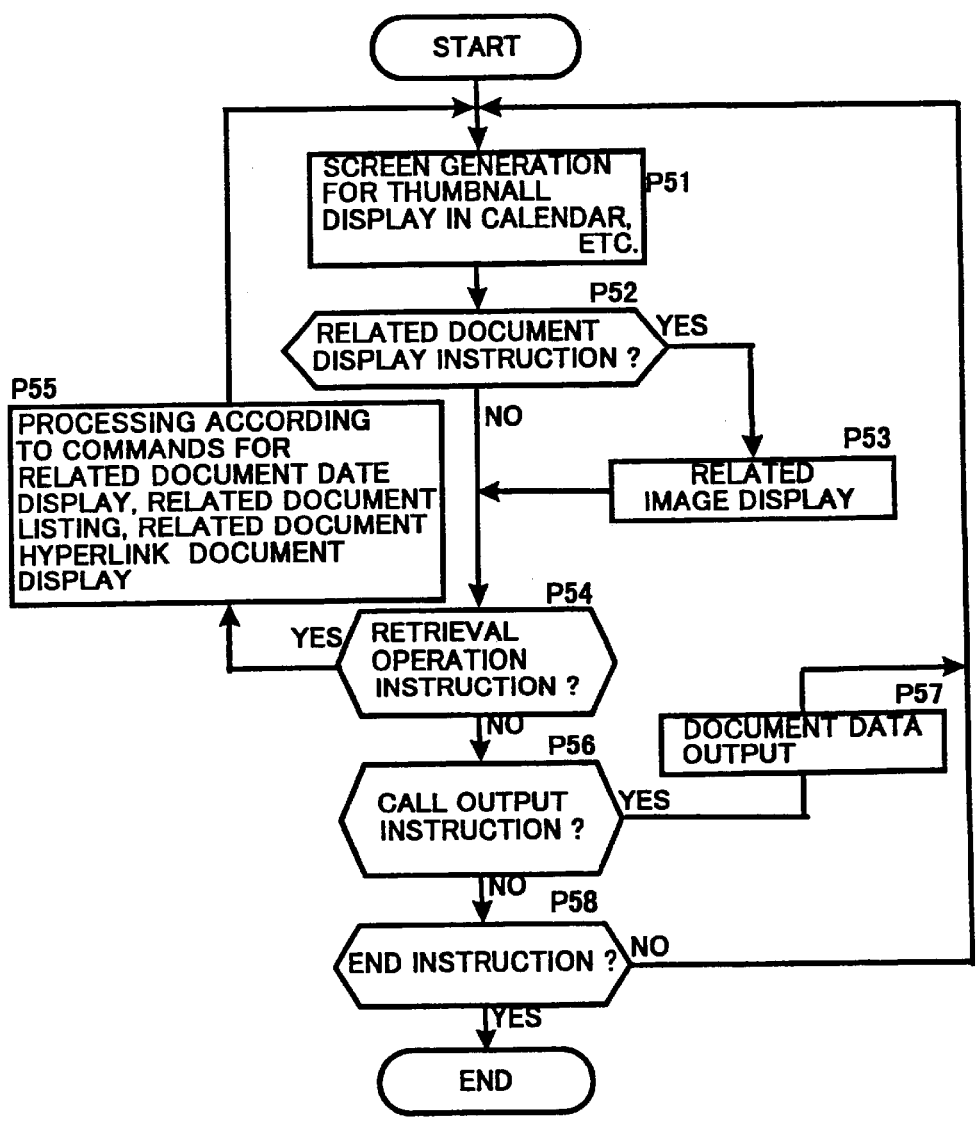
FIG. 14 is a flowchart for reusing filed processing data in the file system.

If the new document data is determined to be identical to the old document data as a result of the determination (Step P37), the same link information is associated with both of the additional data so as to register the additional data to the database and delete the new document data from the mass storage device 13 (Step P38). When the Step P53 in FIG. 14 is executed, the thumbnail image 61 is created and displayed in the calendar view 60 for each date using the old document data in common and the thumbnail image 61 for each date blinks at the same time to highlight that the document data represented by each thumbnail image 61 is an identical document. An existence of the identical document is indicated in the list of the additional data, so that the additional data can be displayed for a check. Therefore, the user can reuse the document data in substantially the same manner by selecting either of the thumbnail images and checking the additional data. The above operation is also applicable to a case for document data not completely identical to the old document data, which will be described later.

If the new document data is determined to be updated document data which has been partially changed from the old document data (Step P39), document data other than document data in the updated region (i.e., the updated data) is deleted from the mass storage device 13 or 16 and only the updated data is stored in the mass storage device 13 or 16 so as to be associated with the additional data. Further, updated link information, for example, version information, is associated with the additional data of both the new and old document data (Step P40), so that the thumbnail image 61 of the updated document data is created and displayed by replacing the corresponding region of the old document data with updated data. At an execution of Step P53 in FIG. 14, the corresponding thumbnail image 61 blinks at relatively longer intervals than for the identical document data, as the updated region is smaller, to highlight a degree of the identity in the calendar view 60.

If a match is found in a preset or greater number of keywords between the new document data and the old document data and as the result the new document data is determined to be related document data which has some relation to the old document data (Step P41), the related link information is associated with the additional data of both the new and old document data in the same manner (Step P42). At Step P53 in FIG. 14, the corresponding thumbnail image 61 blinks at relatively longer intervals than for the identical document data because there is less relation between the new document data and the old document data, such as a smaller number of matched keywords, to highlight a degree of the identity in the calendar view 60.

Accordingly, in filing document data in the mass storage device 13 or 16 as a backup file, by eliminating the identical or updated document, the storage capacities of the mass storage devices 13 and 16 can be prevented from being used wastefully, by which the number of document data which can be stored in the mass storage devices 13 and 16 is increased. In addition, document data having an identity can be easily discriminated from other document data so as to be selected.

Whether the new document data is identical to the old document data or is updated document data is checked by a comparison between the new document data and the old document data in units of a page or for each block in a page by keeping image data of image regions together with character code data, to which the document data has been converted through the OCR processing by the CPU 41, for a fixed period (for example, one month) in the hard disk unit 43. The image data is compared after correction or modification, such as edge matching. In the comparison for each block, as illustrated in FIG. 20, for example, if document blocks such as p1 to p4 and image blocks such as p5 and p6 are included in the document, the data is compared for respective blocks. If a part of the blocks, for example, the block p4, does not match, the block p4 is stored for filing as updated data. Furthermore, because the OCR processing of the document data may not be perfectly performed, when the document data includes only characters, the document data may be determined to be completely identical to the old document data if they completely match in the number of characters, positions of punctuation marks, and the number of words (including a space between characters in English sentences), and be determined to be updated document data if a font size or a color specification for characters is different between them or if the sentences contain revision symbols (specific symbols indicating modifications in the sentences).

Also, even when new document data is not determined to be identical or updated document data, the new document data is stored for filing as related document data if a match occurs in a preset or greater number of keywords between the new document data and old document data or their titles are identical. In addition, when important sentences in the new document data, which may be extracted from the document data, for example, in a method disclosed in Japanese Laid-open Patent Publication No. 9-34905, are identical to those in other old document data, the new document data may be stored also as related document data for the other old document data containing the identical sentences. In this processing, the keywords not included in common in the other old document data may be additionally registered (in other words, merged) also to the other old document data, so that the other old document data can be retrieved according to the keywords not included in the document data. Thus, related document data, which cannot be retrieved based upon the keywords included in the document data, can be extracted according to the added keywords, by which a retrieval efficiency is improved.

In addition, link information may be registered to the database by moving the thumbnail image 61 in the calendar view 60 on top of another with an operation of the mouse 47 for the server machine 12 (what is called, a drag and drop operation) and inputting the link information to the database. When the relation becomes unclear after a long elapse of time, link information may be registered with the drag and drop operation after checking the document data by specifying, displaying or recording on a sheet additional data, such as keywords or titles of respective document data in a row so as to be compared, or by processing the document data with the OCR processing and inverting only different portions in the OCR processing.

As described above, in this embodiment, new document data processed by the copying machine 11 is compared with the old document data, and if an identity is found between the new and old document data, they are related with each other according to the link information. If the new and old document are identical, storing the new document data is avoided. When the new document data is determined to be updated document, only the updated portions are stored. Thus, the storage capacities of the mass storage devices 13 and 16 can be efficiently used. In addition, for the document data having an identity with the old document data, each thumbnail image 61 in the calendar view 60 blinks so as to highlight a degree of the identity, by which a presence or absence of similar document data or duplicated document data or relations in document data can be easily recognized by dates in the calendar view 60 and display formats of the thumbnail images 61. Therefore, the document data having an identity can be easily discriminated from other document data so as to be selected.

Accordingly, a user can store document data to be processed with the copying machine 11 in a mass storage device as a backup file without a need for any filing works, and further, the user can easily select and usefully reuse the document data without a need for keeping documents, such as copied materials, in a file.

Furthermore, new document data processed by the copying machine 11 is stored in the mass storage device 13 or 16, or the storage thereof is canceled on the condition that the same user ID is used. Therefore, even when the same document is processed with the copying machine 11 or another copying machine on an intranet by a plurality of users, such as, when materials for a meeting are created for distribution by the copying machine 11 or by another copying machine on the intranet by a user and the distributed materials are copied again by the copying machine 11 by another user, the same document data is stored in the mass storage device 13 or 16 for respective users, and the same document data is prevented from being stored by another user. In addition, a security of the document data can be ensured, because document data stored in the mass storage device 13 or 16 and associated with a certain user ID can be referenced only when the same user ID is used.

As another aspect of the above embodiment, though not illustrated in the drawings, a thumbnail image 61 of document data having an identity (i.e., similarity or relation) may be displayed, for example, in red when the document data is identical, and the display color may be made thinner as a degree of the identity becomes lower. Alternatively, similar colors may be used to highlight the degree of the identity. For example, identical document data may be displayed in red, while document data that is not identical but has an identity be displayed in rose or orange.

As another aspect of the above embodiment, the file system may be configured so that a message is displayed in the display 44 to a user who uses the copying machine 11. The message asks the user whether or not document data is stored in the mass storage device 13 or 16, or whether new document data is determined to be updated document data. This makes it possible for a user to cancel the storage of the processed data in the mass storage device 13 or 16, or to store document data as updated document data only when he or she confirms and instructs that the new document data processed by the copying machine 11 is identical with the old document data which has been stored or that the new document data is updated document data, by which the user can avoid an execution of processing against his or her will.

Specifically, it is hard to determine the identity between new document data and old document data without error due to, for example, revisions made in a document P or dust or the like on the document P. If the determination standard is lowered, a lot of document data are extracted because of having an identity, while if the determination standard is raised, not only does the determination take longer, but document data may be incorrectly determined to have an identity in spite of being identical document data or determined to have no identity in spite of being document data having an identity.

Accordingly, when an existence of old document data is identified as a result of being determined to have an identity to new document data at a threshold level where there is little or no possibility that the document P was misread due to, for example, dust, etc. during processing with the copying machine 11, the server machine 12 first creates a thumbnail image 61 of new document data and displays the thumbnail image 61 so as to blink in the calendar view 60 together with the corresponding old document data in the mass storage device 13 or 16. A user may determine whether the new document data is identical to the old document data based upon a date in the calendar view 60 and a display format of the thumbnail image 61. For indistinguishable document data, the user may determine its identity or necessity by displaying the old document data on the display 44 by double-clicking the thumbnail image 61 of the corresponding old document data. If a delete button is clicked after clicking the thumbnail image 61 of the new document data inverted in blinking as a result of this determination, the new document data is canceled to be stored in the mass storage device 13 or 16, while if a register button for independent registration, update registration with region specification, or related registration, is clicked after clicking the thumbnail image 61, the new document data is stored in the mass storage device 13 or 16 in the same manner as for the above embodiment.

Accordingly, document data of an original document processed with the copying machine 11 can be prevented from being deleted by mistake or from being stored as updated document data as the result of being incorrectly determined due to, for example, dust, etc. on the original document, by which the new document data can be appropriately stored in the mass storage device 13 or 16. New document data may be temporarily stored in the hard disk unit 43 of the server machine 12 to perform the above identity determination before storing the data in the mass storage device 13 or 16, and a thumbnail image 61 of deleted document data may be deleted from the calendar view 60.

Further, the degree of an identity of processing data processed with the copying machine 11 can be determined based upon a degree of identity of an image of an original document and the original document itself, from which the processing data has been obtained with the copying machine 11.

More specifically, as illustrated in FIG. 21(*a*), the identity of the image of the original document may be determined by evaluating the identity of such aspects of the image as, for example, the arrangement of image portions and character portions, the ratio between the image portions and the character portions, and respective contents of the image and character portions. The image portions can be evaluated by evaluating such aspects as, for example, the arrangement of images, the colors of the images, and the character portions can be evaluated by evaluating aspects, such as for example, the arrangement of characters, colors of the characters, the number of the characters, the number of punctuation, the kind of fonts, each aspect weighted as illustrated in the drawing. The words which are extracted by the OCR processing are not used in determining the degree of the identity and used only for determining if the document is identical.

Further, the identity of the original document itself may be determined by evaluating the identity of such aspects of the original document itself as, for example, the size, the direction, whether one-sided or two-sided, and whether a sheet or a book, as illustrated in FIG. 21(*b*).

Each aspect is given an evaluation value and the aggregate amount is given as the identity evaluation value for determining a degree of the identity. For example, assuming that the maximum aggregate value of 100 represents the complete identity, when the aggregate amount is between 0 and 40, it is determined that the data has no identity, when the amount is between 40 and 95, the data has an identity, and when the amount exceeds 95, the data is identical.

The identity of data may be determined based upon a result of evaluating all of the aspects of both an image of an original document and the original document itself as above, or, for making the determination in a simple manner or quickly, based upon a result of evaluating only either the aspects of an image of an original document or those of the original document itself, or based upon a result of evaluating selected aspects of an image of an original document and/or the original document itself.

The result of the above determination can be informed to the operator, for example, by displaying the above aggregate number or a graph representing the number in the display 44, or by changing the display of related thumbnail images 61 according to the degree of the identity in substantially the same manner as described above, such that the operator can determine whether to store the data or delete the data when adding the link information.

When the data is determined as identical, the data is not stored with the link information added thereto. When the data is determined not to have an identity, the data is stored. When the data is determined to have an identity, the image data may be either stored or deleted with the link information added thereto.

While the above embodiment has been described for processing with the use of the same user ID, a user ID may be used only for using the copying machine 11 or for permitting document data processing with the copying machine 11, and all document data can be reused without using a user ID.

In addition, document data may be displayed either as a thumbnail images 61 in the calendar view 60, a list in order of an identity degree beginning with the highest one with highlighting, or the like, or a combination of them.

According to the present invention, processing data processed by a processing unit is prevented from being stored in a memory device if it is determined to be identical with stored data based on their identity, by which a storage capacity of the memory device can be used efficiently. If the processing data is determined to have an identity, it can be stored with link information added so as to be related with stored data, by which, for the processing data to which the link information is added, specific information for specifying the data, for example, reduced images (thumbnail images) to be displayed in a calendar format having an identity, are highlighted so as to indicate their identity degree. Therefore the processing data having an identity can be easily discriminated from other processing data so as to be selected.

Further, a user can store processing data to be processed as a backup file without needing any filing works so that the data can be usefully reused. Therefore, for example, when copied materials have been lost, desired processing data can be easily selected for reuse.

Furthermore, by storing or canceling processing data or by relating it with other processing data for each user ID, the processing data can be stored for each user and the security of the processing data is ensured. Additionally, by a user's confirmation and specification of storing processing data, incorrect deletion of document data or incorrect relating of document data with each other can be avoided. As a result, a useful file system is provided.

Numerous additional modifications and variations of the present invention are possible in light of the above teachings. It is therefore to be understood that within the scope of the appended claims, the present invention may be practiced otherwise than specifically described herein.

This document claims priority to and contains subject matter related to Japanese Patent Application No. 10-226064 filed in the Japanese Patent Office on Aug. 10, 1998. The entire contents of Japanese Patent Application No. 10-226064 are incorporated herein by reference.

What is claimed is:

1. A file system, comprising:

processing means for processing first data with at least one of a copying function configured to read image data of an original document and record the read image data on a sheet, a transmitting function configured to send and receive image data or character data via a communication line, and a recording function configured to record received image data or character data on a sheet;

memory means for storing the first data processed by the processing means;

identity determination means for determining a similarity between the first data and second data stored in the memory means;

storage management means for storing the first data in the memory means on the basis of a result of a determination made by the identity determination means; and means for associating additional data with the first data and second data, wherein the storage management means cancels storage of the first data in the memory means when the identity determination means determines that the first data is identical to the second data stored in the memory means, and wherein link information is added to each of the additional data associated with the first and second data when the first data corresponds to the second data.

2. The file system according to claim 1, wherein the similarity is determined by optical character recognition.

3. The file system according to claim 2, wherein the similarity is determined in accordance with identification obtained by optical character recognition.

4. The file system according to claim 3, wherein the identification comprises a key word.

5. The file system according to claim 1, wherein the first data comprises first image data and the second data comprises second image data.

* * * * *